United States Patent

Honda et al.

[11] Patent Number: 5,945,760
[45] Date of Patent: Aug. 31, 1999

[54] MOTOR WITH BUILT-IN PERMANENT MAGNETS

[75] Inventors: Yukio Honda, Katano; Hiroshi Murakami, Suita; Kazushige Narazaki, Katano; Hiroshi Itoh, Takefu; Masayuki Shinto, Takefu; Yoshinari Asano, Takefu; Naoyuki Kadoya, Kadoma, all of Japan

[73] Assignee: Matsushita Electric Industrial Co., Ltd., Kadoma, Japan

[21] Appl. No.: 08/928,086

[22] Filed: Sep. 12, 1997

Related U.S. Application Data

[63] Continuation of application No. 08/655,824, May 31, 1996, abandoned.

[30] Foreign Application Priority Data

| May 31, 1995 | [JP] | Japan | 7-134023 |
| Jun. 7, 1995 | [JP] | Japan | 7-140801 |
| Jun. 7, 1995 | [JP] | Japan | 7-140802 |
| Jun. 8, 1995 | [JP] | Japan | 7-142129 |

[51] Int. Cl.$^6$ ................................ H02K 21/14
[52] U.S. Cl. .......................................... 310/156
[58] Field of Search ........................ 310/156, 261, 310/262

[56] References Cited

U.S. PATENT DOCUMENTS

| 2,939,025 | 5/1960 | Williford, Jr. | 310/156 |
| 4,358,697 | 11/1982 | Liu et al. | 310/156 |
| 4,663,551 | 5/1987 | Weh et al. | 310/156 |
| 4,924,130 | 5/1990 | Fratta | 310/156 |
| 4,939,398 | 7/1990 | Lloyd | 310/156 |
| 5,510,662 | 4/1996 | Tanimoto et al. | 310/156 |
| 5,679,995 | 10/1997 | Nagate et al. | 310/156 |

FOREIGN PATENT DOCUMENTS

| 6-38415 | 2/1994 | Japan | 310/156 |
| 6-66277 | 9/1994 | Japan . | |
| 07099745 | 4/1995 | Japan . | |
| 7-303357 | 11/1995 | Japan . | |
| 1114562 | 5/1968 | United Kingdom . | |
| 91/09443 | 6/1991 | WIPO . | |

*Primary Examiner*—Clayton LaBalle
*Attorney, Agent, or Firm*—Wenderoth, Lind & Ponack, L.L.P.

[57] ABSTRACT

A rotor of a motor includes a plurality of sets of permanent magnets $8a$, $8b$ embedded in the rotor. Each includes a permanent magnet at an inner side and another permanent magnet at an outer side with a distance between them. Each permanent magnet $8a$, $8b$ is formed like an arch projecting towards the center of the rotor. Magnetic flux flows easily through an interval between the permanent magnets at inner and outer sides, and the inductance in a q-axis is enlarged. Then, the reluctance torque is generated in addition to the magnet torque, and the motor has a high torque and a high output power.

36 Claims, 22 Drawing Sheets

MOTOR WITH BUILT-IN PERMANENT MAGNETS

This application is a continuation of now abandoned application, Ser. No. 08/655,824, filed May 31, 1996.

BACKGROUND OF THE INVENTION

1. Field of the Invention

The present invention relates to a motor having permanent magnets built in a rotor thereof.

2. Description of the Prior Art

It is known that in a magnetic motor a one-layer permanent magnets in a rotor made of a high permeability material such as iron. For example, in a prior art surface magnet motor, permanent magnets are attached to a surface of a rotor.

Recently, environmental issues have attracted intensive attention. In order to save energy, a motor with built-in permanent magnets, that is, with permanent magnets embedded inside a rotor, has been used to replace the surface magnet motor.

FIG. 1 shows an example of a prior art motor with built-in permanent magnets. The motor includes a rotor 3' and a stator 5. In the motor, each permanent magnet 17 has an arch-form and projects towards the center of the rotor 3' and is embedded inside a rotor core 3a' made of an iron core of a high magnetic permeability material or of silicon steel sheets. The motor shown in FIG. 1 has four poles, and four permanent magnets 17 are arranged along a circumferential direction of the rotor to have N and S poles which are alternately arranged. The stator 2 has teeth 6.

In the above-mentioned motor, there is brought about a difference between an inductance Ld in a d-axis direction (refer to FIG. 1) connecting the center of each permanent magnet with the center of the rotor, and an inductance in a q-axis direction (refer to FIG. 1) rotated by 90° from the d-axis direction in terms of an electrical angle. Therefore, a reluctance torque is produced in addition to a magnet torque of the permanent magnets 17. A total torque T is expressed in Equation (1):

$$T = Pn * \{\Psi a * Iq + \frac{1}{2}(Ld - Lq) * Id * Iq\}, \quad (1)$$

wherein Pn denotes a number of pole pairs, Ψa denotes a magnetic flux in d-axis, Ld denotes an inductance in d-axis, Lq denotes an inductance in q-axis, Iq denotes a current in q-axis and Id denotes a current in d-axis. Equation (1) represents a voltage equation after the dq conversion. Magnet torque and reluctance torque are expressed in the first term and in the second term in a term expressed in parentheses { and } in Equation (1).

In the prior art surface magnet motor, since a magnetic permeability of the permanent magnet is approximately equal to that of air, the inductances Ld and Lq have nearly the same value, and therefore no reluctance torque is generated.

In contrast, in the prior art motor with built-in permanent magnets, the d-axis direction corresponds to a direction in which a magnetic flux is generated by the permanent magnets 17, and as shown in FIG. 1, a flow 21 of magnetic flux in the d-axis direction penetrates twice the permanent magnet having approximately the same magnetic permeability as air, thereby the d-axis inductance Ld is considerably reduced because of an increase in magnetic resistance. On the other hand, a flow 22 of magnetic flux in the q-axis direction is directed to a side face of the permanent magnet 17, passing the side face of the magnet as indicated in FIG. 1. As a result, the magnetic resistance is reduced and the q-axis inductance Lq is increased. The d-axis inductance Ld becomes consequently different from the d-axis inductance Lq. If a Id in d-axis current is supplied, the reluctance torque is generated.

FIG. 2 is a magnetic flux vector diagram illustrating this relationship. The magnet torque is generated by multiplying a magnetic flux Ψa with a current Iq in a direction perpendicularly electrically to the magnetic flux. The magnetic flux Ψa is a d-axis component of the total magnetic flux Ψ0. Similarly, the reluctance torque is generated by multiplying magnetic fluxes Ld*Id, Lq*Iq with currents Iq, Id flowing perpendicularly to the magnetic flux, respectively. A sum of these two torques becomes the total torque T.

The total torque T depends on a phase β of an input current I0, where Iq=I0*cos β and Id=I0*sin β. FIG. 3 shows a relationship of the magnet torque, reluctance torque and total torque when the current phase β is changed while the current value is kept at I0. The magnet torque is maximum when the current phase is 0°, and it becomes smaller as the phase β is increased, and it becomes zero when the phase is 90°. On the contrary, the reluctance torque has a maximum value when the current phase is 45°. Therefore, the total torque T becomes maximum in a range of 0–45° of the current phase. Marks o indicate values obtained in an experiment, and the values agree well with values calculated according to Equation (1). That is, with the same current, a larger torque is obtained in the motor having permanent magnets embedded in the rotor, thereby to utilize the reluctance torque, than in the surface magnet motor.

Next, a problem of the prior art motor which has permanent magnets embedded in the rotor is explained. The reluctance torque is utilized to some extent in the motor. However, as indicated in FIG. 1, a flow 22 of the magnetic flux in the q-axis direction is obstructed by an end 17a of the permanent magnet 17 and cannot enter into the rotor. Most of the flow barely touches an outer peripheral part 18 of the permanent magnet 17. Thus, an amount of the magnetic flux is small, and the inductance Lq in q-axis cannot be increased.

As mentioned before, the larger the difference is between the inductances Lq and Ld (Ld is very small), the more the reluctance torque is generated by the same current. However, the q-axis inductance Lq cannot be increased so much in the prior art motor, and therefore the difference of the inductances Lq and Ld cannot be made large.

SUMMARY OF THE INVENTION

An object of the present invention is to provide a motor, with built-in permanent magnets, which is highly efficient so as to generate a high output.

When the permanent magnets of the same amount in a motor with built-in permanent magnets are used, the d-axis inductance Ld is not greatly changed physically. However, the inventors noted that the q-axis inductance Lq may be increased if a design of the permanent magnets to be embedded is devised. In one aspect of the present invention, a motor including a stator and a rotor having a rotor core into which a plurality of sets of permanent magnets are embedded. A set of the permanent magnets includes a plurality of permanent magnets, and the plurality of sets of permanent magnets are arranged so as to have N and S poles alternately at outer peripheral sides of the permanent magnets. The permanent magnets in a set extend so that ends thereof are positioned near an outer periphery of the rotor. Thus, a path is provided for magnetic flux between the permanent magnets at the outer side and those at the inner side. This structure increases the q-axis inductance Lq as much as possible and enlarges a difference between the q-axis inductance Lq and the d-axis inductance Ld as much as possible, so that the reluctance torque produced with the same current is utilized to the utmost. A number of the permanent magnets in a set is, for example, two. Preferably, each of the permanent magnets has a shape of an arch projecting towards a center of the rotor. For example, an interval between two permanent magnets in a set of permanent magnets is constant.

In a second aspect of the motor of the invention, the interval between two-layer permanent magnets is wider at least at ends thereof at a leading side of a rotating direction of the rotor than at other parts thereof. In a different way, the interval is wider at ends of the permanent magnets than at other portions. Thus, the concentration of magnetic flux around the ends of the permanent magnet is eased.

In a third aspect of the present invention, in the motor, both ends of each of the permanent magnets are tapered towards the ends thereof near an outer surface of the rotor and extend perpendicularly relative to the surface of the rotor. Then, magnetic flux flowing through a path between two permanent magnets can be enhanced.

In a fourth aspect of the rotor of the present invention, the rotor embeds a plurality of sets each including two permanent magnets in the rotor core. One of the two permanent magnets at an inner side of the rotor has a thickness larger by 3% or more than that of the other of the two permanent magnets at an outer side of the rotor. In a different way, the permanent magnet at an inner side of the rotor is made of a magnetic material having a remanent magnetic flux density larger by 3% or more than a magnetic material of the other of the two permanent magnets at an outer side of the rotor. Then, the magnetic flux of the permanent magnet at the backup side or at the inner side can be enhanced.

An advantage of the present invention is to provide a motor of a higher torque and a higher output power.

Another advantage of the present invention is to provide a motor having improved resistance against demagnetization.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 4:
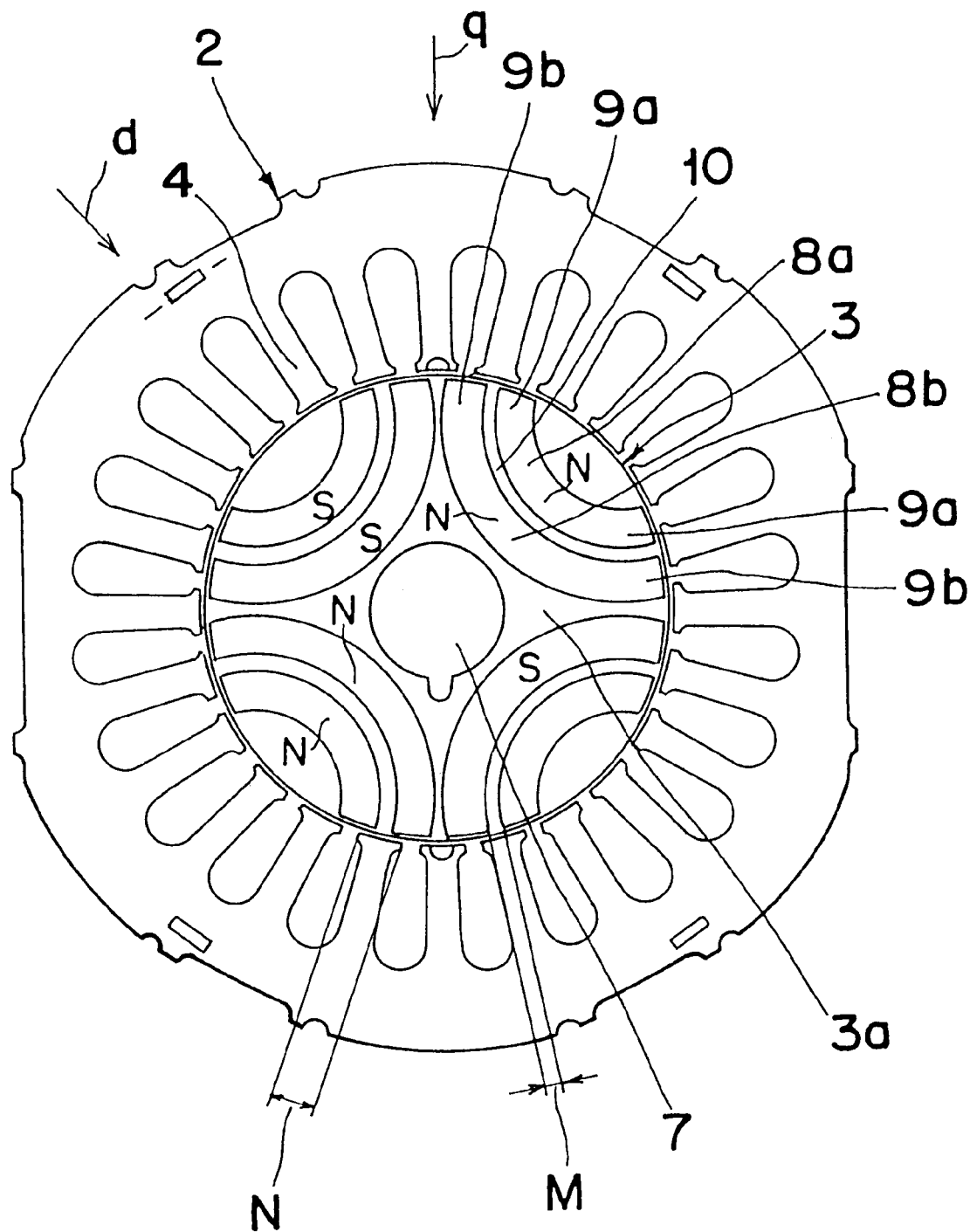
FIG. 4 is a sectional view showing an embodiment of the present invention.
Figure 5:
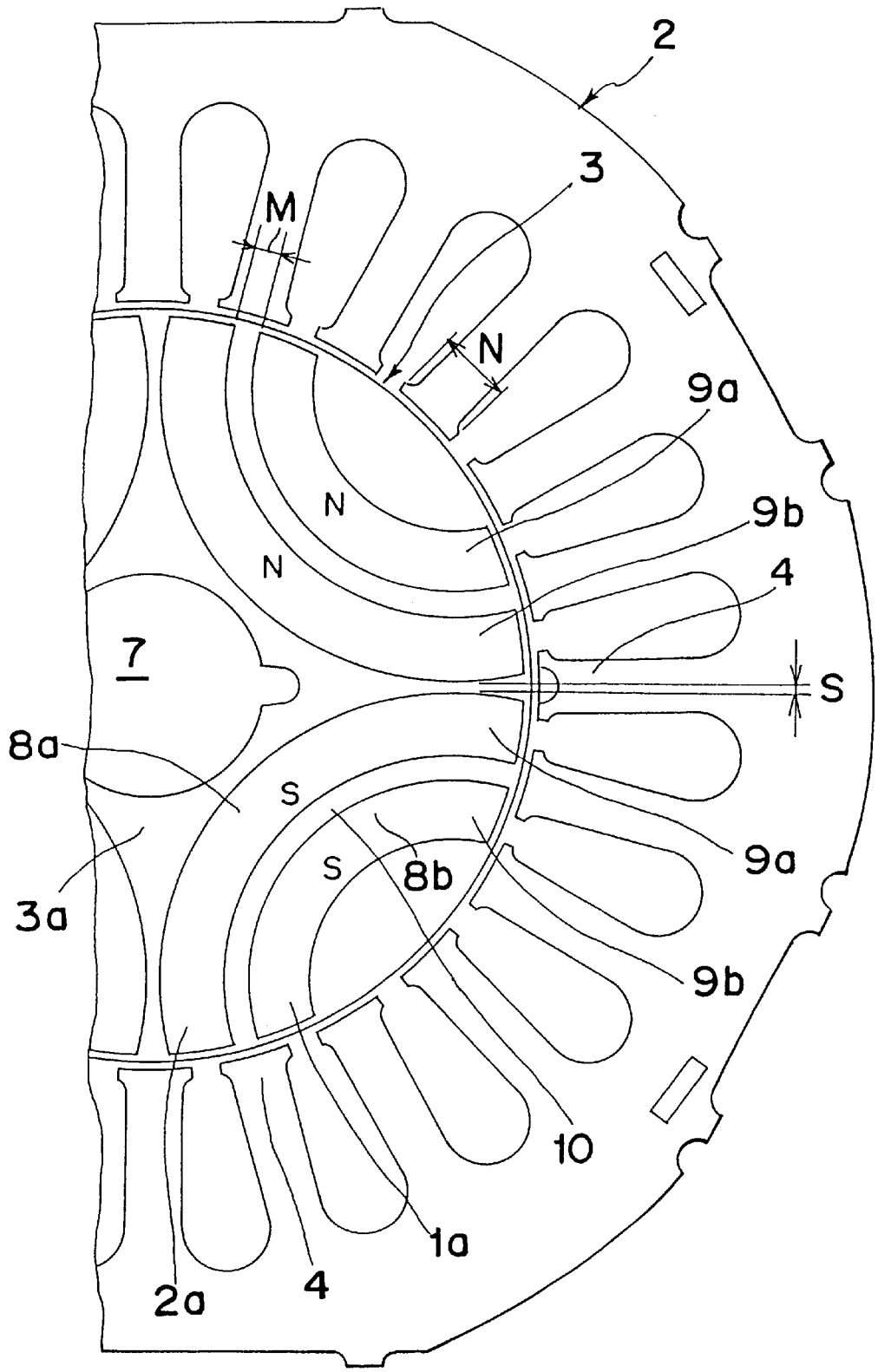
FIG. 5 is a partial enlarged view of FIG. 4.

Referring now to the drawings, wherein like reference characters designate like or corresponding parts throughout the views, embodiments of the present invention will be explained in detail with reference to the drawings. FIGS. 4 and 5 show a first embodiment in which a motor with built-in permanent magnets establish four poles. The motor comprises a rotor 3, adhered to a rotor shaft 7, and a stator 2 which houses the rotor 3.

The rotor 3 comprises four sets of two-layer permanent magnets 8a, 8b embedded in a rotor core 3a made of a high magnetically permeable material. A set of the two-layer permanent magnets is composed of a permanent magnet 8a at an outer side and another permanent magnet 8b at an inner side, and the four sets of two-layer permanent magnets 8a and 8b are arranged to have N and S poles alternately at outer peripheral sides of the rotor. The inner and outer sides are defined with respect to a radial direction from the center of the rotor. In a different way of explanation, a permanent magnet for one pole is divided into two magnets 8a, 8b in a radial direction of the rotor 3. Each of the permanent magnets 8a and 8b is formed like an arch projecting towards the center of the rotor 3, while both ends 9a, 9a thereof are located near the outer periphery of the rotor 3. An interval M between the outer and inner permanent magnets 8*a* and 8*b* has an approximately constant width. In FIG. 4, a d-axis direction is defined as a direction connecting the center of each each of permanent magnets 8*a,* 8*b* with the center of the rotor 3, while a q-axis is defined as a direction connecting a boundary between adjacent poles with the center of the rotor 3. A path 10 of magnetic flux in the q-axis direction is formed through the interval.

The stator 2 has a predetermined number of teeth 4, and stator windings (not shown) are wound therebetween. When an alternating current is supplied to the stator windings, a rotational magnetic flux is generated. Thus a magnet torque and a reluctance torque to be exert on the rotor 3 are generated to rotate it.

It is desirable that the interval M between the outer and inner permanent magnets 8*a* and 8*b* is as small as possible in order to reduce a loss of a magnetomotive force at the permanent magnets 8*a* and 8*b*. However, it is also desirable that the interval is large enough so as not to be magnetically saturated in order to increase a q-axis inductance Lq. Therefore, in the present embodiment, the interval M is set to be about a half of a width N of the teeth 4 so that the magnetic flux generated by the current flowing in the stator windings is not saturated.

Figure 6:
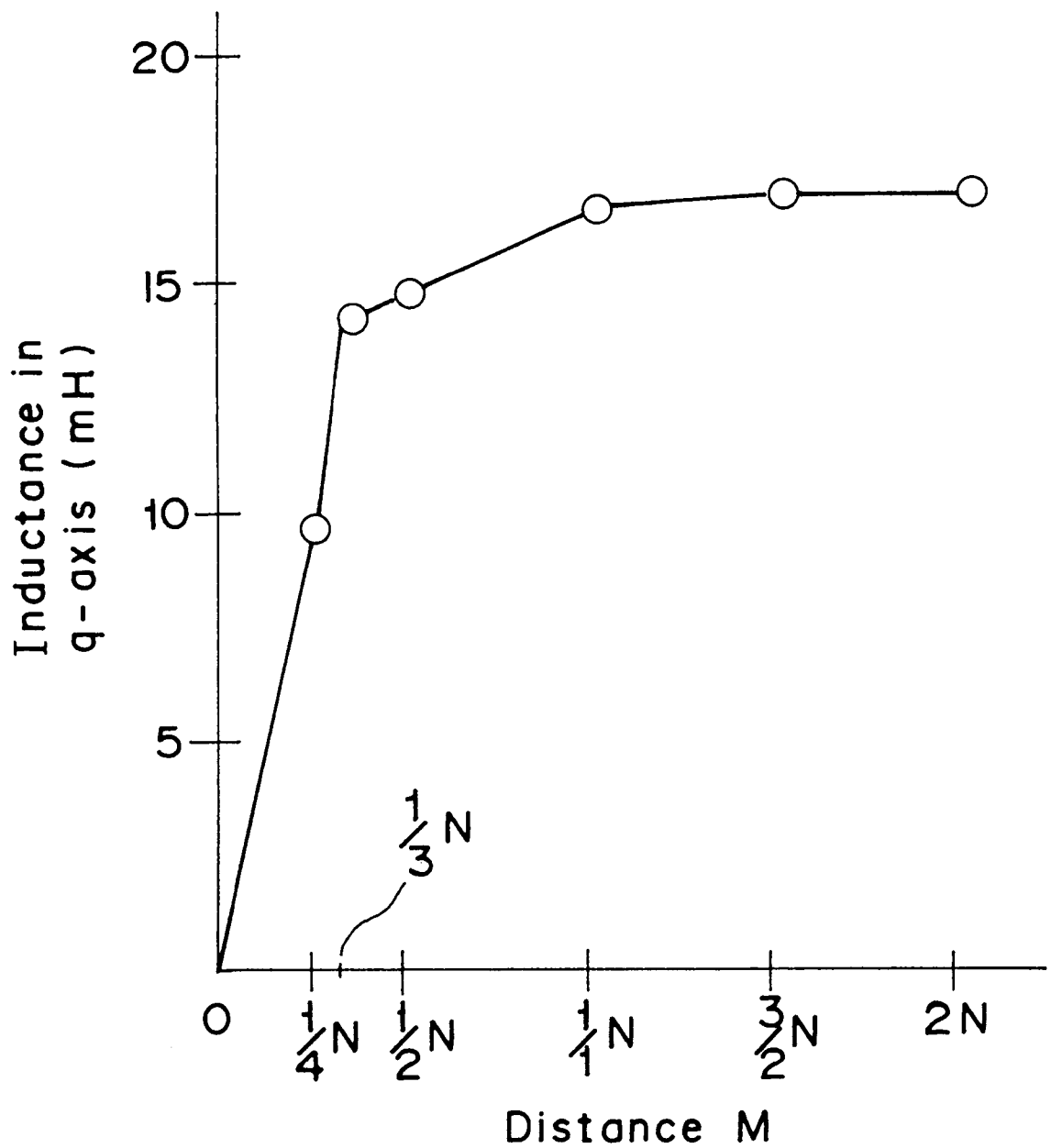
FIG. 6 is a graph of a relation of a width of an interval between inner and outer permanent magnets and q-axis inductance.

This is explained with experimental data shown in FIG. 6 on the interval M and the q-axis inductance Lq. If the interval M is smaller than a third of the width N of the teeth 4, the q-axis inductance Lq rapidly becomes small. On the other hand, even if the interval M is larger than the width N of the teeth 4, the inductance Lq in the q-axis is hardly changed. From this experimental data, it is preferable that the distance between the outer and inner permanent magnets 8*a* and 8*b,* namely, the interval M is larger than a third of the width N of the stator teeth 4.

In order to enhance the magnetic flux as large as possible, the permanent magnet 8*b* at the inner side is constructed as large as possible within a polar pitch (90° if there are four poles as in this embodiment). On the other hand, a gap S (FIG. 5) between adjacent permanent magnets 8*a* and 8*b* is as small as possible to eliminate leakage of the magnetic flux in order to effectively utilize the magnet torque. From the view point of cost, it is preferable to design the outer and inner permanent magnets 8*a,* 8*b* so that the amount of magnets for a pole is kept constant.

In the above-described structure, the path 10 where the magnetic flux in the q-axis direction flows is formed so as not to be saturated magnetically when the motor is driven. Therefore, the inductance Lq in q-axis can be increased to the utmost. At the same time, by using the amount of magnets approximately the same as in the prior art motor with one-layer built-in magnets, the d-axis inductance Ld is made as small as in the prior art motor. In other words, while the d-axis inductance Ld is not changed by using the same amount of magnets, the q-axis inductance Lq is increased by about 15% or more (FIG. 11), so that the reluctance torque resulting from the difference between the q-axis inductance Lq and the d-axis inductance Ld can be utilized to the utmost. Then, the motor has suitable structure for utilizing both the magnet torque and the reluctance torque to the utmost when the motor is driven with the same current.

In the embodiment described above, each of the permanent magnets 8*a* and 8*b* is formed in an arch-like shape projecting towards the center of the rotor. However, the permanent magnets may have other shapes, e.g., a concave U-shape projecting towards the center of the rotor. Although each permanent magnet 8*a,* 8*b* is a permanent magnet up to the ends 9*a,* 9*a* in the embodiment, the ends 9*a,* 9*a* thereof may comprise an air gap (air layer) or may be made of a layer filled with a synthetic resin.

Performance of the motor of the present embodiment is explained further. As explained above, in the motor of the first embodiment, the path of the magnetic flux is provided between the outer and inner permanent magnets. As a result, a magnetic resistance is reduced to markedly increase a q-axis inductance Lq. Accordingly, the reluctance torque is more effectively generated with the same current due to an increase in the difference between the inductances Ld and Lq.

Figure 7:
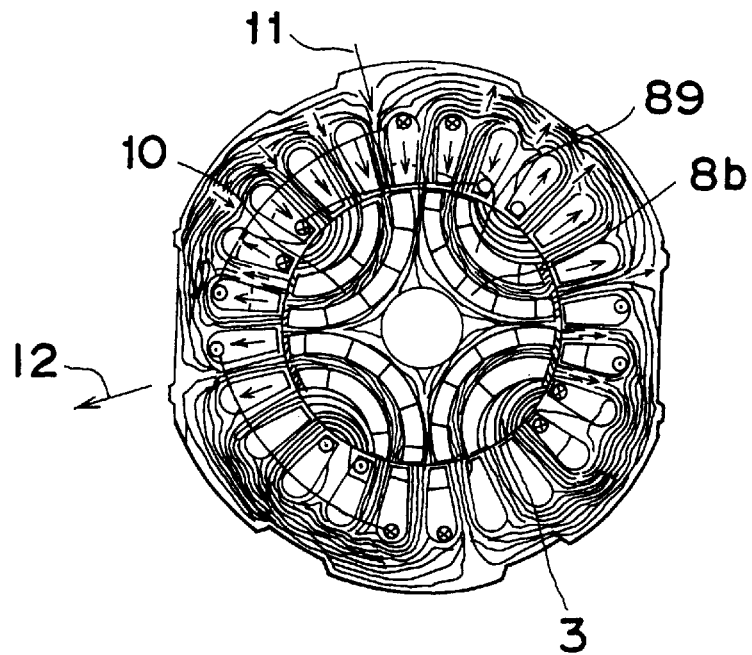
FIG. 7 is a diagram of an analysis of magnetic flux flow in a q-axis direction in the embodiment.
Figure 8:
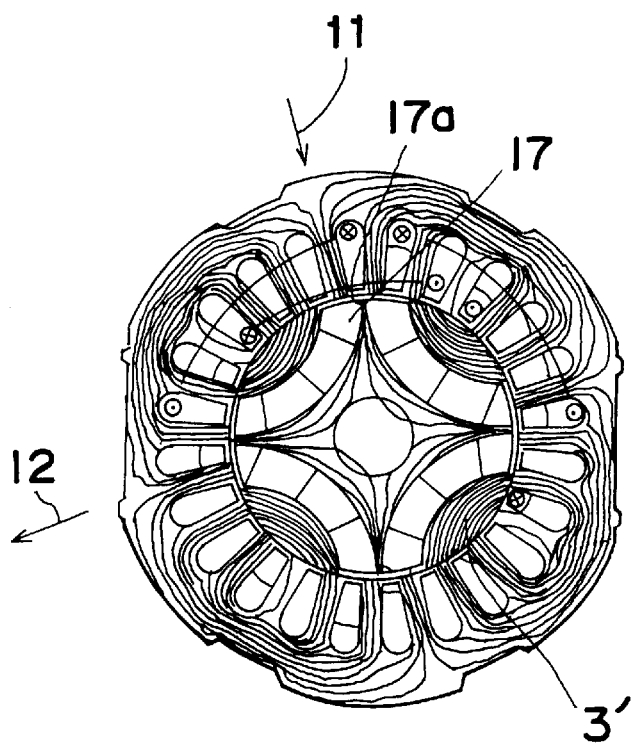
FIG. 8 is a diagram of an analysis of magnetic flux flow in a q-axis direction in the prior art motor.

FIGS. 7 and 8 show how easily magnetic flux in the q-axis direction flows in the motor of the present invention with embedded two-layer magnets and in the prior art motor with one-layer embedded magnets, respectively. As shown in FIG. 8, in the prior art motor using one permanent magnet in one pole, the magnets 17 are thick and therefore, the end 17*a* thereof obstructs magnetic flux 11 generated by the stator windings from entering the rotor. On the other hand, as shown in FIG. 7, in the motor of the present invention having embedded two-layer magnets, because of the presence of the path 10 for the magnetic flux between the outer permanent magnet 8*a* and the inner permanent magnet 8*b,* the magnetic flux 11 generated by the stator windings is not obstructed by the permanent magnets, and passes through the path 10 smoothly toward an exit 12 at the opposite side. In other words, the difference in the ease with which the magnetic flux flows between the prior art and the invention is proportional to a size of the q-axis inductance Lq, and the motor of the present embodiment facilitates efficient passing of magnetic flux so as to have a larger Lq.

Figure 9:
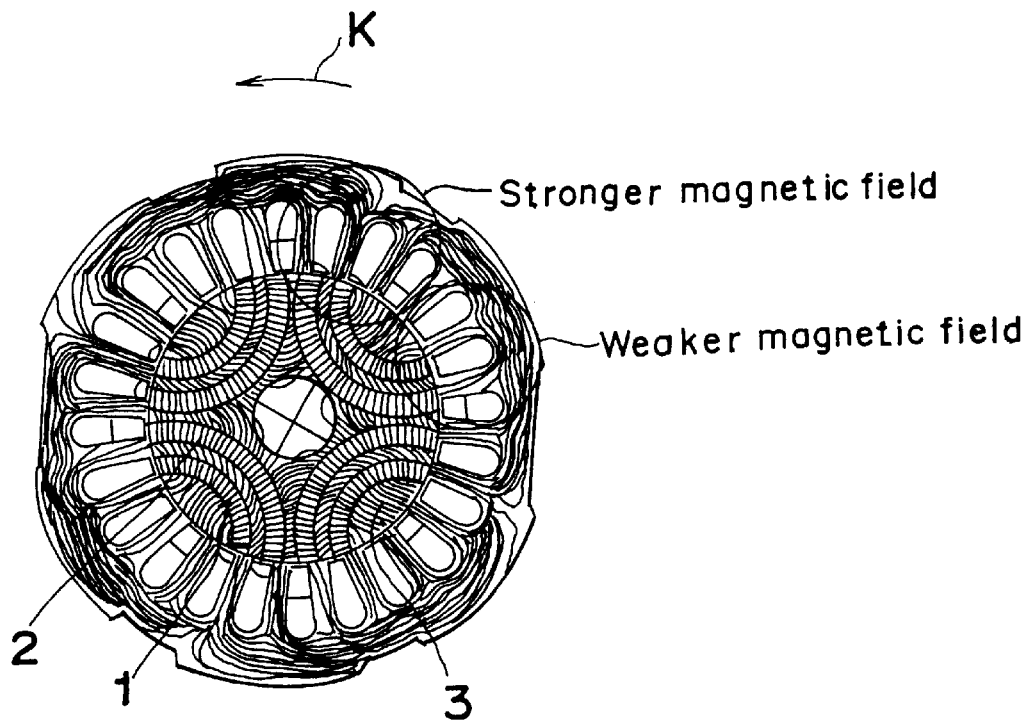
FIG. 9 is a diagram of an analysis of magnetic flux flow when a motor of the embodiment is rotated.
Figure 10:
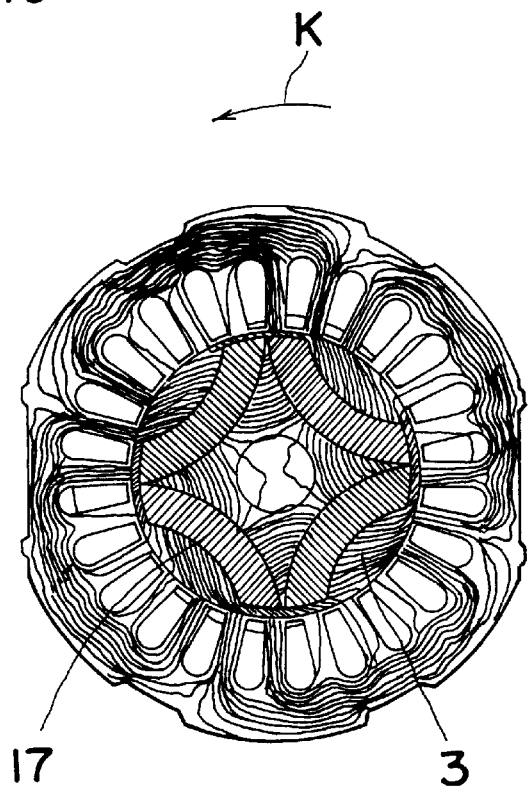
FIG. 10 is a diagram of an analysis of magnetic flux flow when the prior art motor is rotated.

FIGS. 9 and 10 are diagrams of a flow of magnetic fluxes and an amount of the magnetic fluxes in the motor of the present invention and in the prior art motor, respectively, when the motor is actually rotated in a direction K with the same amount of the current. It is found that the above-described difference in the inductance Lq makes it possible to generate more magnetic fluxes in the motor of the embodiment (FIG. 9) than in the prior art motor (FIG. 10). That is, a larger torque is generated due to the larger magnetic flux.

Figure 11:
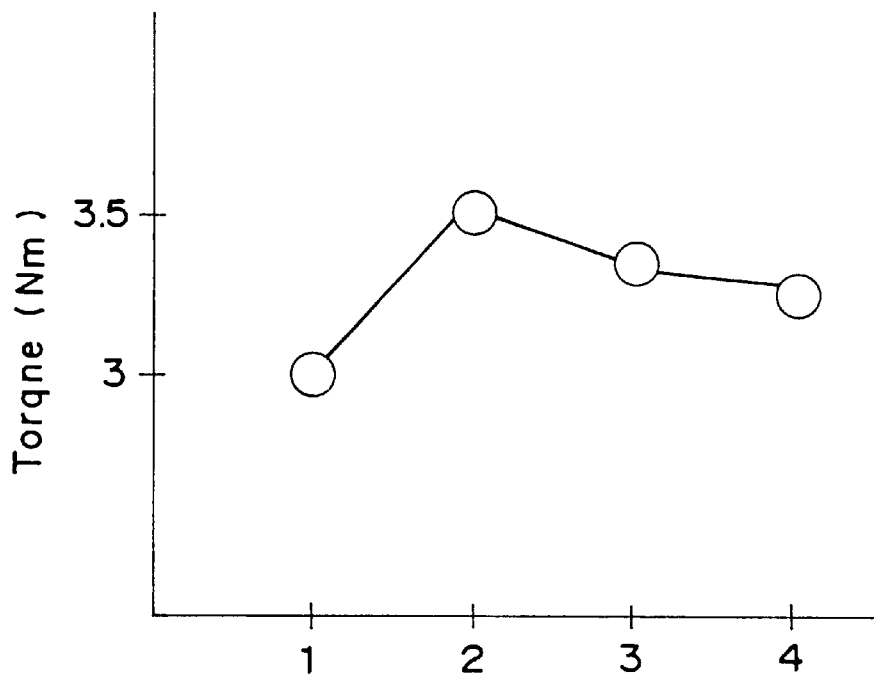
FIG. 11 is a graph of the relationship of a generated torque plotted against a number of layers of magnets.

FIG. 11 shows experimental data on the relationship of a generated torque to a number of layers of magnets. The torque of a motor of a rated output 750 W is measured with a constant current and a constant revolution number. As described before, the magnetic flux in the q-axis direction flows between the inner and outer permanent magnets in the two-layer structure. Then, the magnetic resistance is decreased more than in the prior art motor of one-layer magnets, resulting in the generation of a larger q-axis inductance Lq. Meanwhile, a d-axis inductance Ld is hardly changed because the same amount of magnets is used (and the d-axis inductance Ld is also very small). The difference between the q-axis inductance Lq and the d-axis inductance Ld is accordingly increased, and this increases the reluctance torque generated with the same current. Therefore, the total torque, which is a sum of the reluctance torque and the magnet torque is increased by approximately 15%.

However, as shown in FIG. 11, if a number of layers of permanent magnet is increased further to three or four, the total torque decreases.

Figure 12:
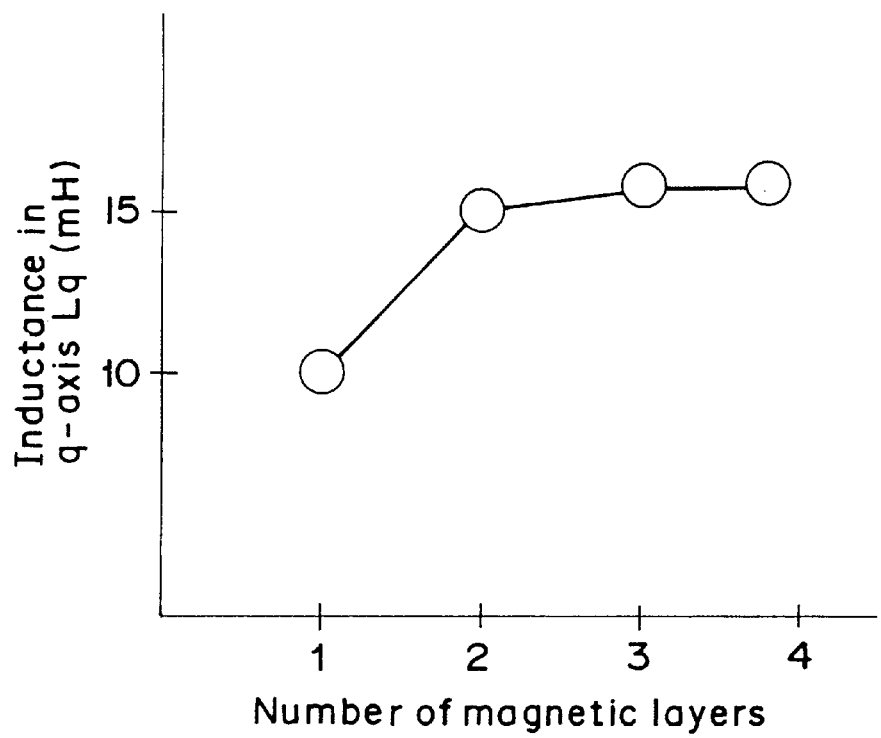
FIG. 12 is a graph of the relationship of a q-axis inductance plotted against of a number of layers of magnets.

FIG. 12 shows experimental data on the relationship between the number of layers of magnets and the q-axis inductance Lq. The q-axis inductance Lq is increased about 50% when the number of layers is changed from one to two. However, Lq is increased slightly when the number of layers of magnets is increased further to three or four, in other words, the advantage is not as large as when the number is changed from one to two. This means that when the number of the permanent magnets are arranged in three or more layers, the q-axis inductance Lq is not changed largely as the magnetic path in the q-axis direction, formed between the permanent magnets, is not magnetically saturated.

Figure 13:
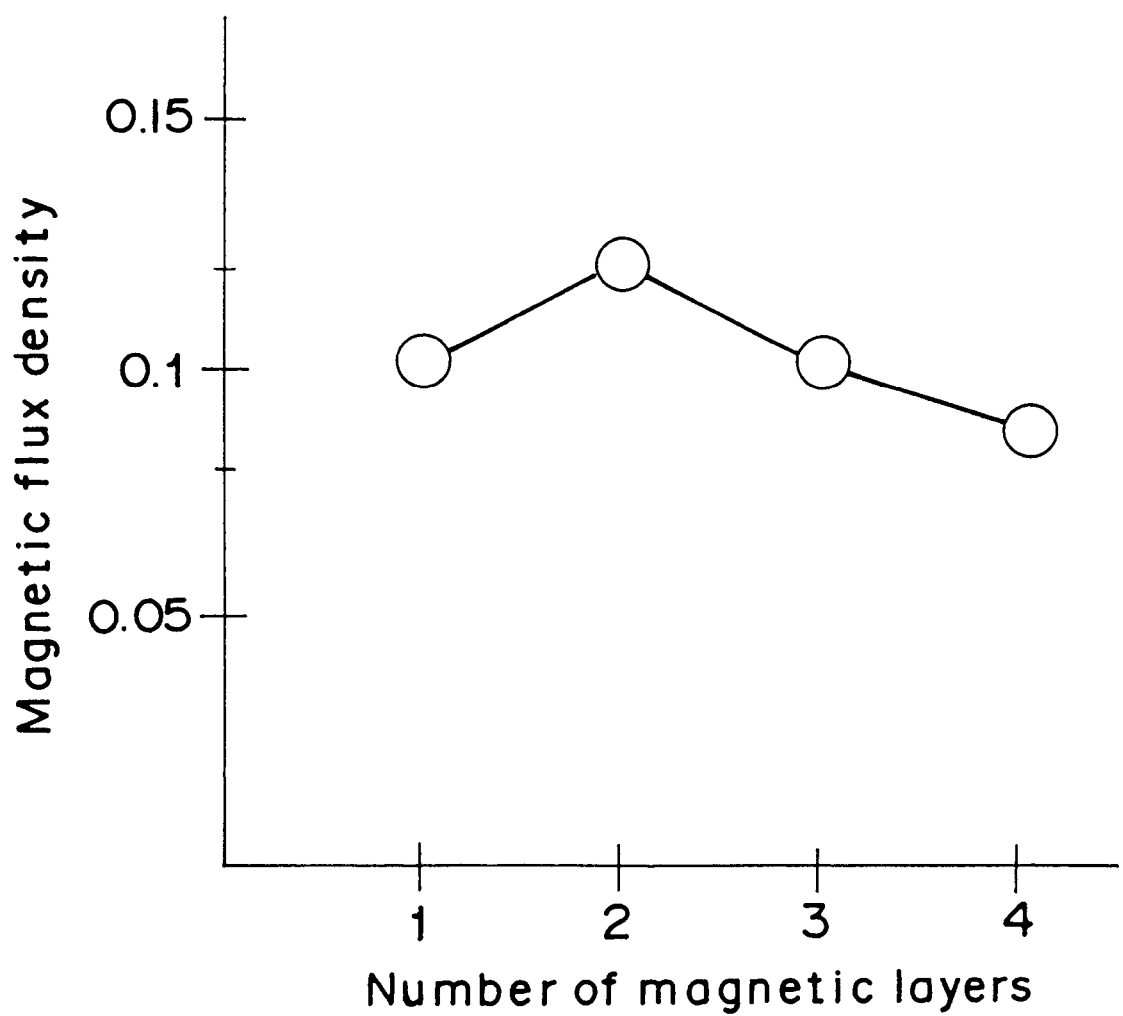
FIG. 13 is a graph of the relationship of magnetic flux of magnets plotted against a number of layers of magnets.

On the other hand, in an example shown in FIG. 13, the magnetic flux generated by the permanent magnets is highest when the permanent magnets are arranged in two layers, in contrast to other cases where the magnetic flux is smaller. In other words, when the number of layers of magnets is increased, the magnetic flux in the q-axis direction becomes easier to pass, so that the q-axis inductance Lq is increased. However, if the number of layers is three or more, each permanent magnet becomes thin and therefore, an operating point of the permanent magnets becomes lower, whereby an amount of generated magnetic flux is decreased. Then, as shown clearly in FIG. 11, the total torque determined by the addition of the magnet torque generated by magnetic flux of magnets and the reluctance torque generated by the difference between the q-axis inductance Lq and the d-axis inductance Ld is a maximum when the number of layers of magnets is two, and it is decreased when the number of layers is smaller than two or larger than two.

Figure 14:
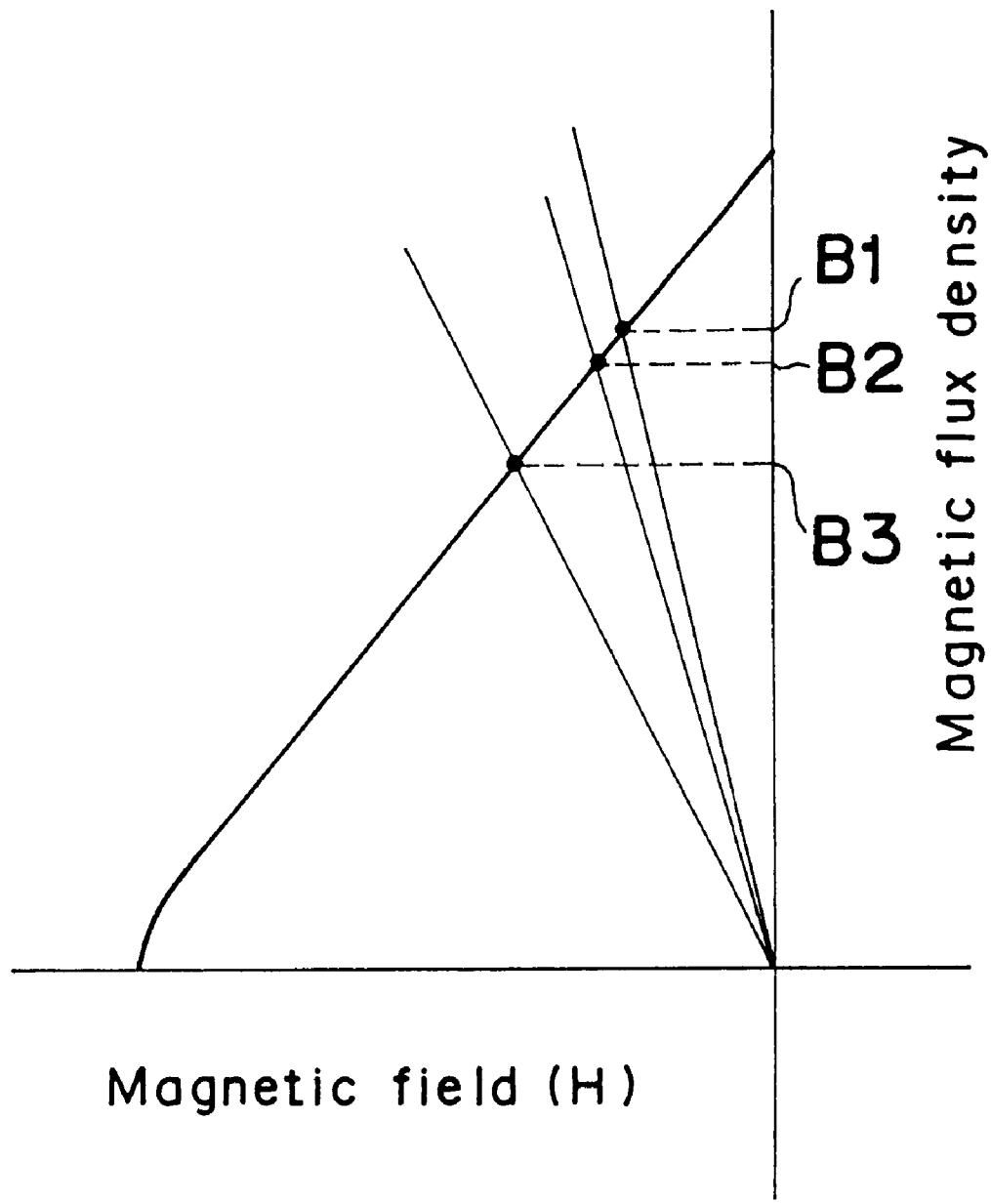
FIG. 14 is a graph of the relationship of a B-H curve of a permanent magnet to operating points of the magnet.

Equation (2) shows a calculation formula for a permeance factor P which determines the operating point of the magnet.

$$P=(Lm*Ag*Kf)/(Lg*Am*Kr), \quad (2)$$

wherein Lm denotes a thickness of the magnet, Lg denotes a length of air gap, Am denotes a sectional area of the magnet, Ag denotes a sectional area of the air gap, Kf denotes a coefficient of a loss of magnetomotive force, and Kr is a leakage coefficient. The permeance factor P is proportional to the thickness Lm of the magnet and inversely proportional to the sectional area Am of the magnet if the length Lg of the air gap, the sectional area Ag of the air gap, the coefficient Kf of the loss of the magnetomotive force and the coefficient Kr of the leak are kept the same. FIG. 14 shows a second quadrant of a B-H (magnetic flux density-magnetic field) curve of the permanent magnet. The operating point of the prior art one-layer magnet is determined by the magnetic flux density at a point B2. In the case of the two-layer magnets, the thickness Lm of the magnet is reduced, while the sectional area Am is increased, whereby an operating point B1 is not different from B2 or slightly increased. On the other hand, if the number of the magnets is three or more, the fact that the thickness Lm is decreased becomes more influential, and the operating point is lowered to a point B3.

To sum up, in the motor with permanent magnets embedded in the rotor, in order to increase the difference between the q-axis inductance Lq and the d-axis inductance Ld for utilizing the reluctance torque, the structure where the two-layer permanent magnets per one pole are arranged is optimum for utilizing both the magnet torque and the reluctance torque represented in Equation (1) most efficiently. Further, the torque generated by the same current is enlarged, and the performance of the motor is improved to a large extent.

Further, when the permanent magnets are arranged in two layers as in the present embodiment, the magnetic flux passing through the tooth 4 of the stator 2 to the rotor 3 is smoothly guided along the path 10 formed between the inner and outer permanent magnets 8a, 8b to other teeth 4. Then, the permanent magnets 8a, 8b are prevented from being demagnetized, or it improves the resistances of demagnetization of the permanent magnets. In contrast, the prior art surface magnet motor or the prior art motor with built-in magnets of one layer have problems with demagnetization. That is, the magnetic flux in the q-axis direction flowing from the teeth 6 to the rotor 3 tends to be exerted on the permanent magnets, thereby subjecting the permanent magnets to demagnetization.

Figure 15:
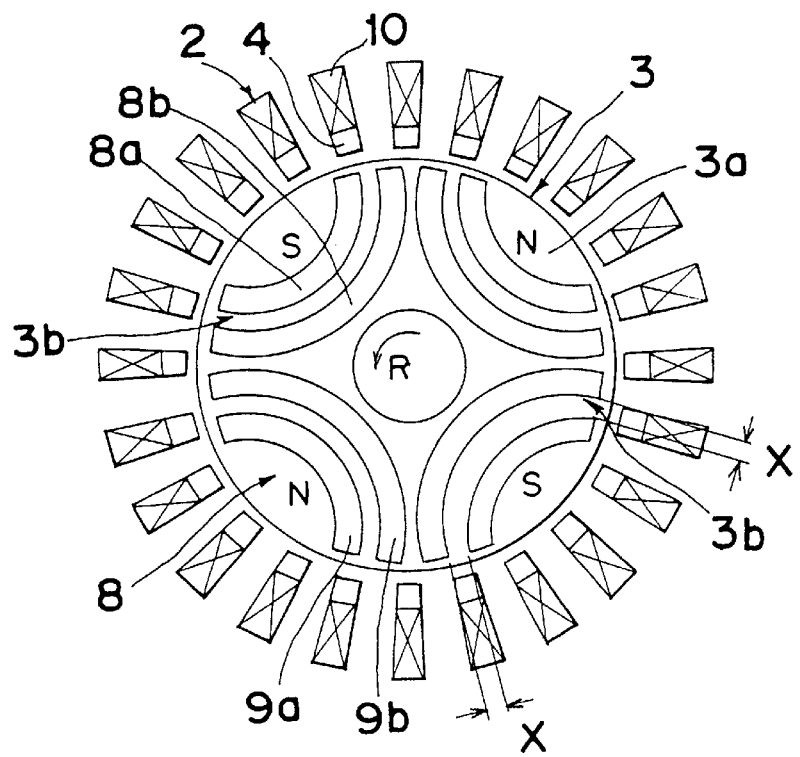
FIG. 15 is a schematic sectional view of a part of the motor of the first embodiment.
Figure 16:
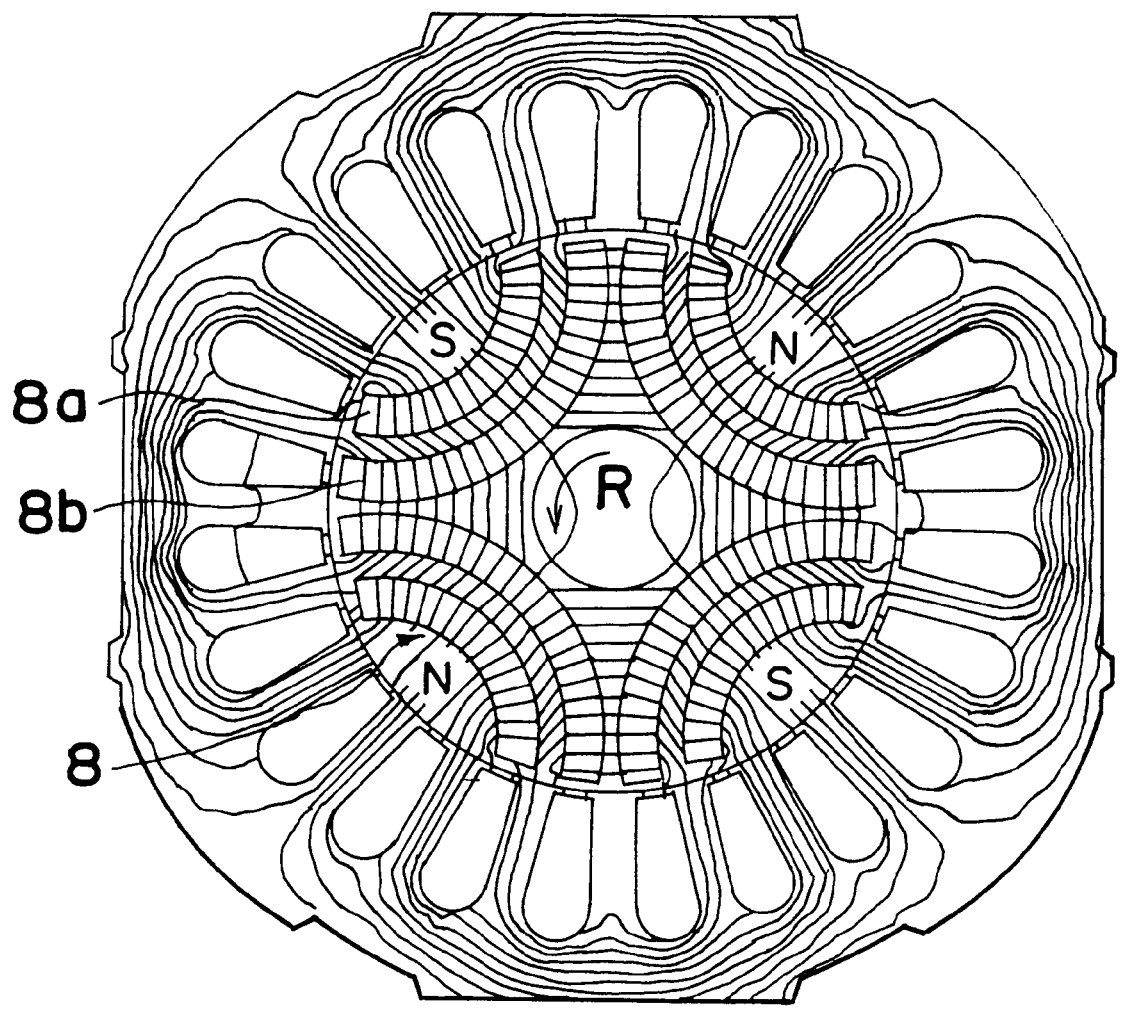
FIG. 16 is a diagram of an analysis result of magnetic flux by a permanent magnet.
Figure 17:
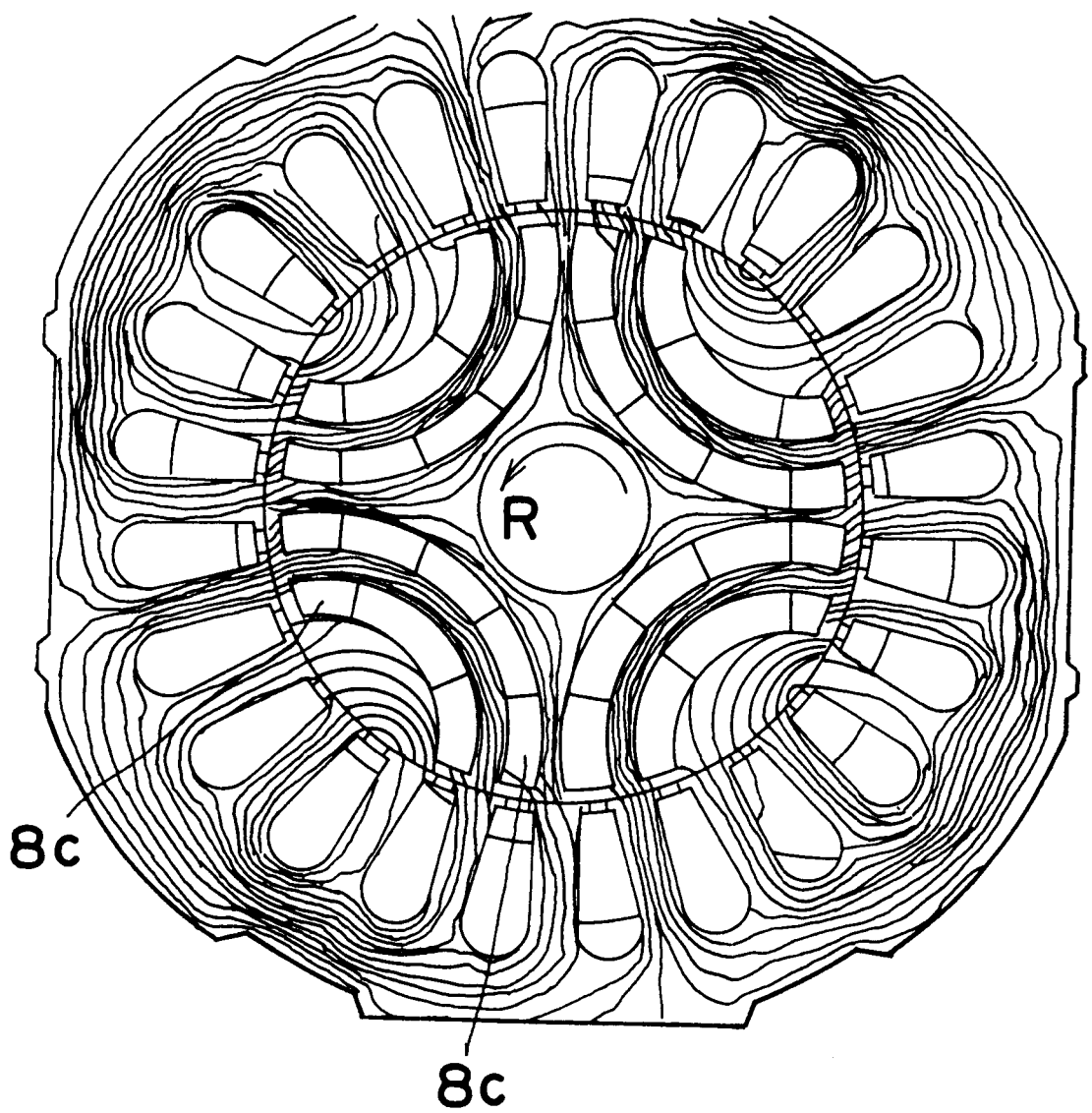
FIG. 17 is a diagram of an analysis result of magnetic flux generated by windings.
Figure 18:
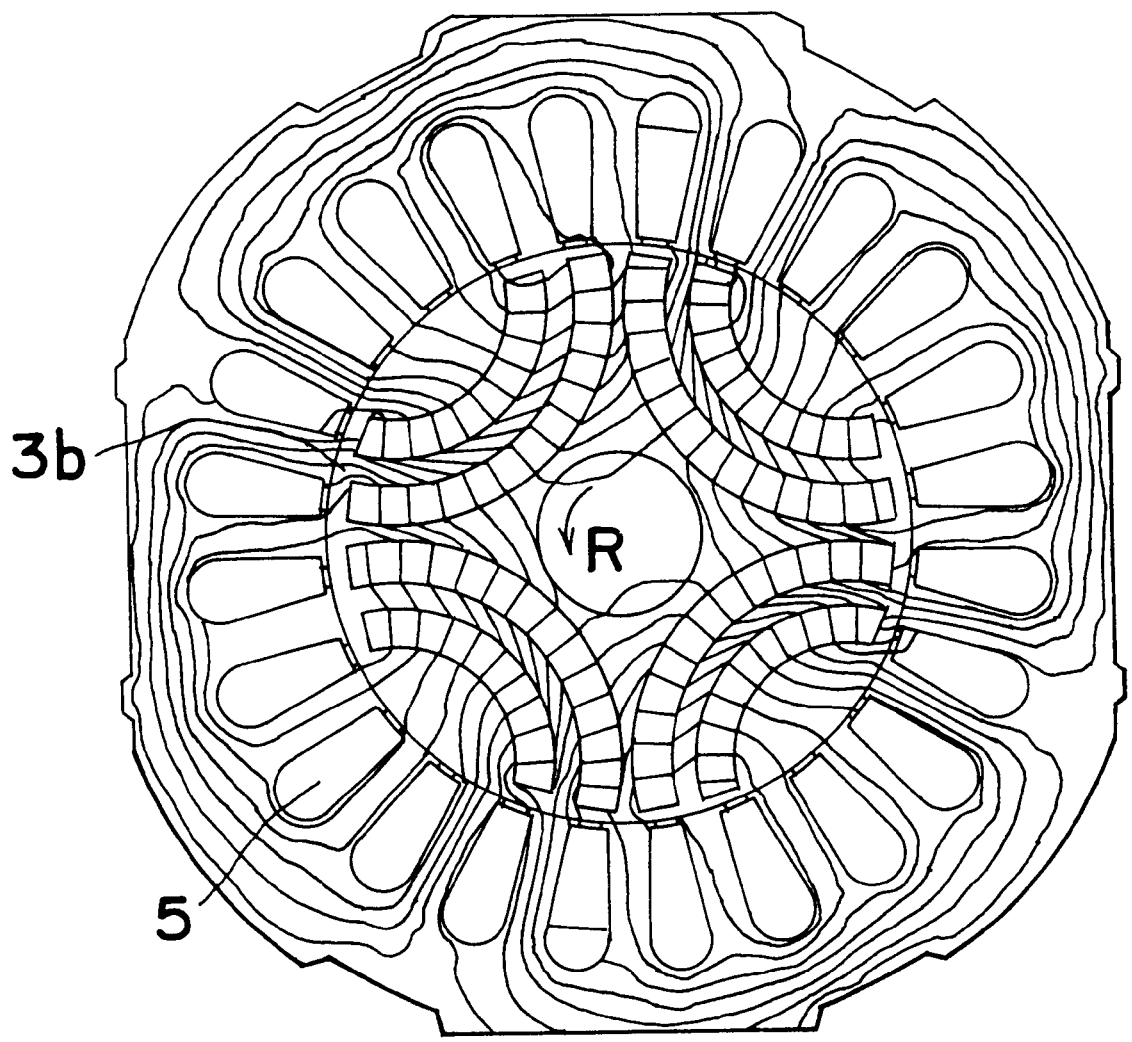
FIG. 18 is a diagram of an analysis result of a synthetic magnetic flux produced by the permanent magnet and the windings.

Next, second and third embodiments of the present invention are explained. In the motor of the first embodiment, as shown in FIG. 15, the interval 3b between the permanent magnets 8a and 8b are constant. Then, it is a problem that a magnetic flux synthesized from a magnetic flux generated by the permanent magnets 8a, 8b embedded in the rotor core 3a and a magnetic flux produced by the windings of the stator 2 tends to concentrate at the interval or gap 3b at the ends 9a, 9b of permanent magnets 8a, 8b at the leading side of a rotating direction R of the rotor 3. This is explained with reference to FIGS. 16–18. FIG. 16 shows an analysis of magnetic flux formed only by permanent magnets 1, 2. FIG. 17 shows magnetic flux generated by the windings 10 of the stator 2, in which permanent magnets are regarded as magnetic voids 8c. FIG. 18 shows synthetic magnetic flux by the permanent magnets 8 and windings 10. Lines of magnetic force are densely concentrated at each interval 3b of ends 9a, 9b of permanent magnets 8a, 8b located at the leading side of the rotor 3 rotating in the R direction shown in FIGS. 15–18. A blank denoted by 5 in FIG. 18 shows a space between the teeth 4. The concentration of magnetic flux at the intervals 3b induces an increase in core loss, causing the rotor core 3a to generate heat and eventually deteriorating the efficiency of the motor.

Further, in the motor of the first embodiment, two layers of the permanent magnets 8a and 8b are spaced generally in parallel to each other. Therefore, amounts of magnetic fluxes of two permanent magnets 8a, 8b at the surface of the rotor 3 is determined solely by a surface area of an outer peripheral side of the permanent magnet 8a at the outer side in the rotor core 3a, that is, a magnet torque at both ends 9b of the permanent magnet 8b located inside the permanent magnet 8a is not fully utilized.

Under the circumstances, it is desirable to lessen the concentration of the magnetic flux generated at the interval 3b between the ends of the two permanent magnets at the leading side of the rotating direction R and improve the efficiency of the motor.

Figure 19:
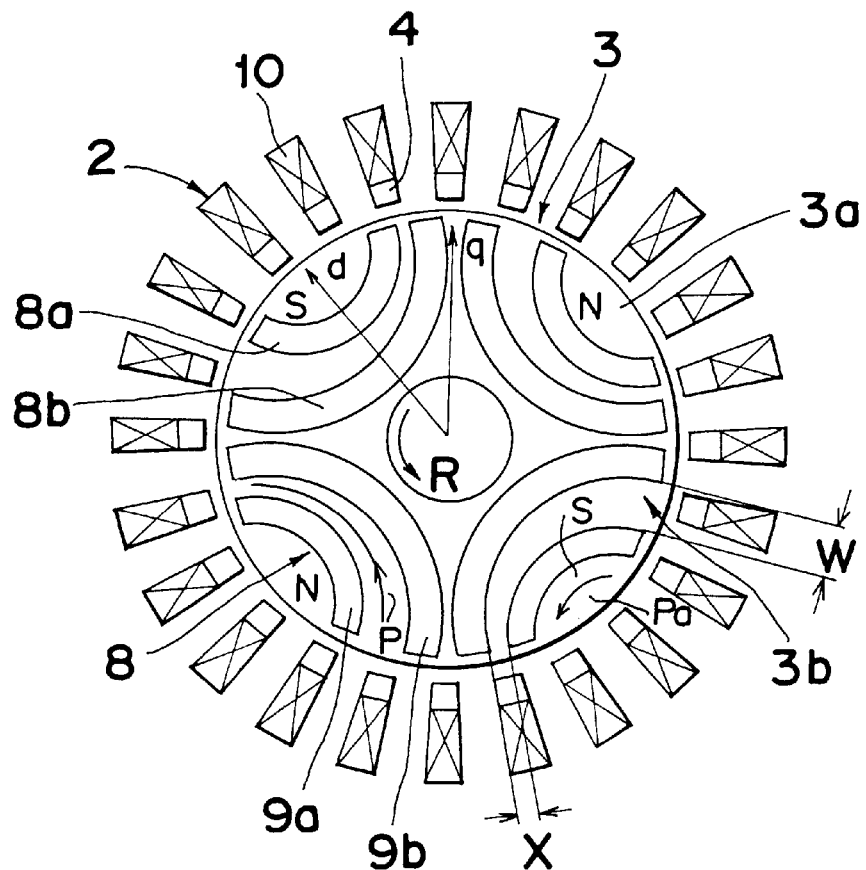
FIG. 19 is a sectional view of a second embodiment of the present invention.

In the second embodiment of the present invention, in order to solve the problems, a rotor with permanent magnets is designed to lessen the concentration of magnetic flux at specified positions, while utilizing both a magnet torque and a reluctance torque efficiently. FIG. 19 represents a motor in accordance with the second embodiment of the present invention. The motor includes a rotor 3, adhered to a rotor shaft 7, and a stator 2 which houses the rotor 3. The rotor 3 includes four sets of permanent magnets 8a, 8b embedded in an iron rotor core 3a thereof. The permanent magnets 8a, 8b in each set for a pole are spaced with a distance an interval 3b between them in a radial direction of the rotor 3. The permanent magnets 8a, 8b of each set are adjacent to each other with S and N poles arranged alternately. Moreover, the two-layer permanent magnets 8a, 8b in each set show the same polarity at outer peripheries thereof. All of the permanent magnets 8a at the outer side and the permanent magnets 8b at the inner side of the rotor have shapes of arc in a centripetal direction of the rotor, as in the first embodiment.

The interval 3b between ends 9a, 9b of the permanent magnets 8a and 8b in each set at the leading side of rotating direction R of the rotor 3 has a width w which is wider than the interval at the other ends of the permanent magnets which has a smaller width x.

Meanwhile, the stator 2 has a plurality of teeth 4, with windings 10 provided in the teeth 4. A rotational magnetic field is generated when a current is supplied to the windings 10.

In the above-described motor, the rotor 3 has a main body 3a coated with iron which is highly magnetically permeable and therefore easy to pass a magnetic flux when receiving the rotational magnetic field from the windings 10. The rotor also has permanent magnets 8 (8a, 8b) of a low magnetic permeability and which do not allow the magnetic flux to pass easily. At the same time, the rotor 3 is so adapted as to show an inductance in a direction of d-axis which is the radial direction passing the centers of the permanent magnets 8 of each set, different from an inductance in a direction of q-axis in which an electrical angle intersects at right angles to the d-axis direction, as shown in FIG. 19.

In the motor, the magnetic flux generated by the windings 10 is not allowed to pass in the d-axis direction of FIG. 19 thereby to remarkably reduce the inductance. On the other hand, a magnetic path is generated at the interval of the inner and outer permanent magnets 8b and 8a in the q-axis direction having the electrical angle orthogonal to the d-axis direction. Thus, the magnetic flux is facilitated to pass to increase the inductance, or a reluctance torque is effectively utilized. A magnetic path is formed also in a Pa direction as shown in FIG. 19.

In the first embodiment shown in FIG. 4, when the rotor 3 is rotated in the R direction, the magnetic flux is concentrated and easily saturated at the interval 3b (having the width x) at the ends 9a and 9b of the permanent magnets 8a and 8b at the leading side in the rotating direction R. On the contrary, according to the second embodiment, because the interval 3b between the ends 9a and 9b of the permanent magnets 8a and 8b at the leading side in the rotating direction R is set wide, as indicated by W in FIG. 19, the concentration of magnetic flux at the interval 3b is lessened.

In the second embodiment, a rotating position and a revolution number of the rotor 3 are detected beforehand by a Hall device or an encoder. In order to generate a large reluctance torque and a large magnet torque, an alternating current of a frequency corresponding to the revolution number of the rotor 3 and with a shifted phase is supplied to the windings 10 of the stator 2, so that the current has a peak at a position slightly shifted in phase from the q-axis.

In the above-described motor according to the second embodiment, it is advantageous that the magnetic flux generated at the interval at the leading side of the rotor rotating in the widened direction can be prevented from being concentrated so much, as described above. Further, when each of the permanent magnets embedded in two layers has a shape of an arc projecting towards the center of the rotor, the magnetic flux related to a reluctance torque is smoothly guided between the permanent magnets along the projecting arc. Thus, the magnetic resistance related to the formation of a magnetic path is reduced, thereby improving the efficiency of the motor.

Figure 20:
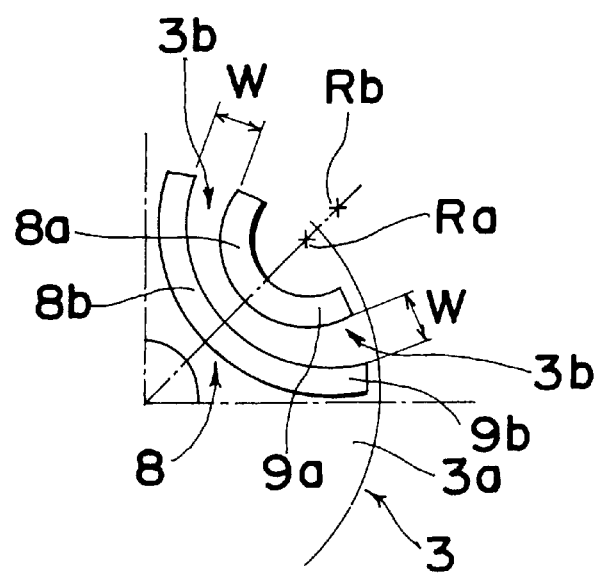
FIG. 20 is a partial sectional view of a third embodiment of the present invention.

Next, a third embodiment of the invention is described with reference to FIGS. 20 and 21. As shown in FIG. 20 schematically, in the third embodiment, a center Rb of curvature of the permanent magnet 8b at the inner side in the two layers is set to be farther from the center of the rotor 3 than a center Ra of curvature of the permanent magnet 8a at the outer side. Thus, each of the intervals 3b between the ends 9a, 9b of permanent magnets 8a, 8b is formed wide. Except for this point, the structure of the second embodiment is the same as that of the second embodiment, and the common parts in the motor shown in FIG. 20 are designated by the same reference numerals, and the description thereon will be omitted here.

In the third embodiment, each interval 3b between ends 9a, 9b of the permanent magnets 8a and 8b at the leading side of the rotation direction R is kept as wide as W, or the interval at the leading side of the rotor is wide at all times, irrespective of the rotating direction of the rotor 3, i.e., whether the rotor 3 is rotated forward or backward. The concentration of magnetic flux at the interval 3b is accordingly lessened, as in the second embodiment. As a result core loss is reduced.

Figure 21:
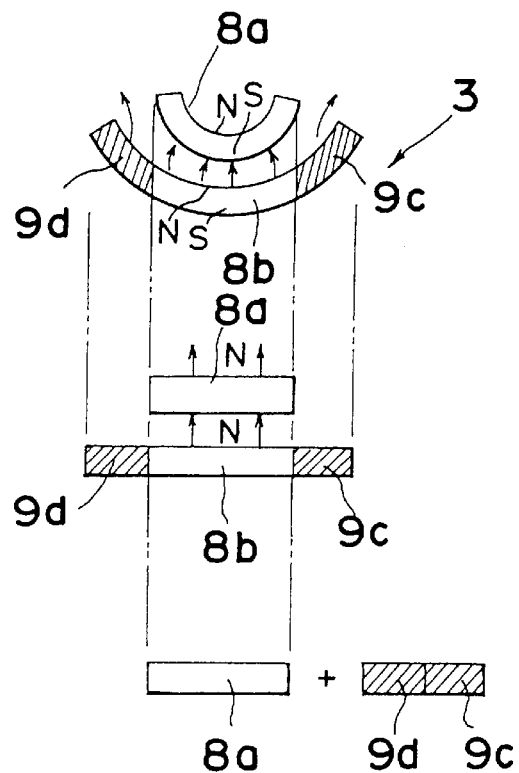
FIG. 21 is a diagram for explaining the principle of the second embodiment.

As shown in FIG. 21, the inner permanent magnet 8b can increase magnetic flux further by parts 9c, 9d indicated by hatched lines in the drawing (refer (a) in FIG. 21). In other words, as shown in (b) schematically in FIG. 21, a magnetic flux N generated by the permanent magnet 8a at the side face is backed up by magnetic flux N formed at a central part of the permanent magnet 8b arranged at the rear side of the above permanent magnet 8a and having the same surface area as the permanent magnet 8a. Meanwhile, as shown in (c), magnetic flux generated at both ends 9c, 9d of the permanent magnet 8b directly reach the surface of the rotor 3. Thus, besides the surface area of the permanent magnet 8a at the outer side, the surface area at both ends of the permanent magnet 8b at the inner side are so as added to be used effectively magnetically. Accordingly, a sum of magnetic flux due to the permanent magnet 8a and magnetic flux by the ends 9c, 9d is output to the surface of the rotor 3. Therefore, because the effective surface area of the permanent magnets 8 is increased, an amount of magnetic flux is increased efficiently so that a stronger magnet torque is generated.

In the second and third embodiments, four sets of permanent magnets 8a, 8b are employed, but a number of the sets may be different from four. Moreover, the shape of the permanent magnet 8 is not restricted to the arc projecting towards the center of the rotor. Although each of the permanent magnets 8a, 8b is totally made of a permanent magnet up to the ends 9a, 9b, the ends 9a, 9b thereof may be an air gap (air layer) or may be made of a synthetic resin layer. That is, these embodiments may be modified in various ways based on the spirit thereof which should not be excluded from the scope of the present invention.

Next, fourth and fifth embodiments of the present invention are described. The fourth and fifth embodiments solve a further problem of the motor of the first embodiment which is explained below. In the motor of the first embodiment, the interval is provided between the permanent magnets 8a and 8b for the magnetic flux to pass therethrough in order to effectively utilize the reluctance torque. Then, as shown in FIG. 16, the magnetic flux coming out from both ends of the permanent magnet 8b at the inner side directly flows to the stator 2, without entering the permanent magnet 8a at the outer side, that is, without backing up the ends of the permanent magnet 8a at the outer side. Then, the outer permanent magnet 8a is backed up less by the inner permanent magnet 8b as a whole. An amount of magnetic flux contributing to the magnet torque at the permanent magnet 8a at the outer side is consequently decreased, thereby reducing the total magnet torque.

Figure 22:
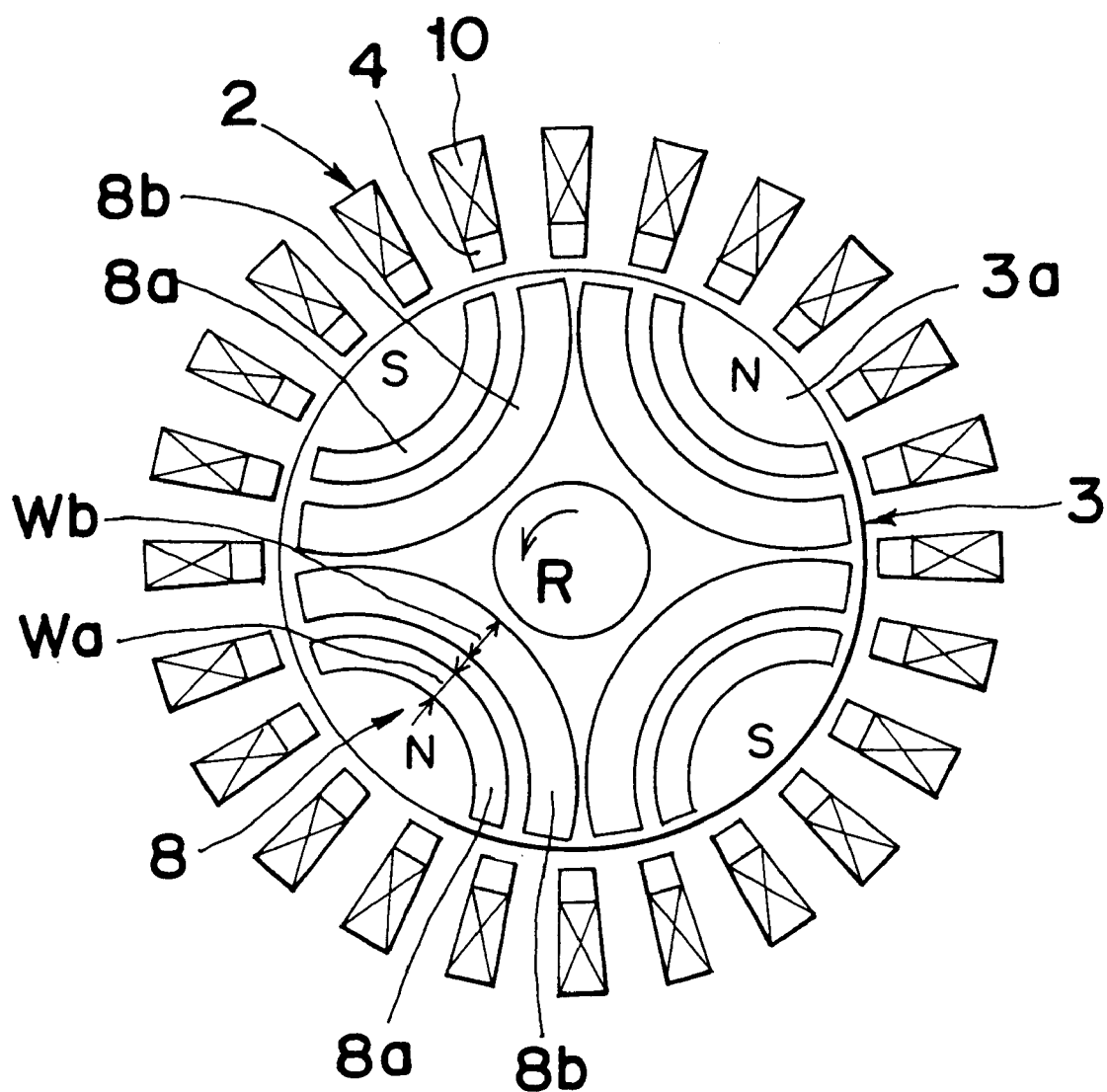
FIG. 22 is a sectional view of a fourth embodiment of the present invention.

FIG. 22 is a sectional view of the motor of the fourth embodiment of the present invention. The motor includes a rotor 3 adhered to a rotor shaft 7 and a stator 2 which houses the rotor 3. The rotor 3 has four sets of permanent magnets 8a and 8b embedded in a rotor core 3a made of iron. Each set of the permanent magnets 8a, 8b for a pole is formed in two layers with an interval between them in a radial direction of the rotor. The sets of the permanent magnets 8a, 8b are set to be adjacent to each other so as to have S and N poles arranged alternately. Moreover, the two-layer permanent magnets 8a, 8b in each set have the same polarity at outer peripheries thereof. Both outer and inner permanent magnets 8a, 8b are formed like an arch projecting towards the center of the rotor 3. The outer and inner permanent magnets 8a, 8b arranged in the two-layer structure are parallel to each other with a constant distance between them. It is to be noted that the inner permanent magnet 8b has a thickness Wb, as shown in FIG. 22, in the radial direction of the rotor 3, while the outer permanent magnet 8a has a thickness Wa which is smaller by 5% than Wb.

The stator 2 includes a plurality of teeth 4. Windings 10 are disposed between the teeth 4. A rotational magnetic field is generated by supplying an alternating current to the windings 10.

Figure 23:
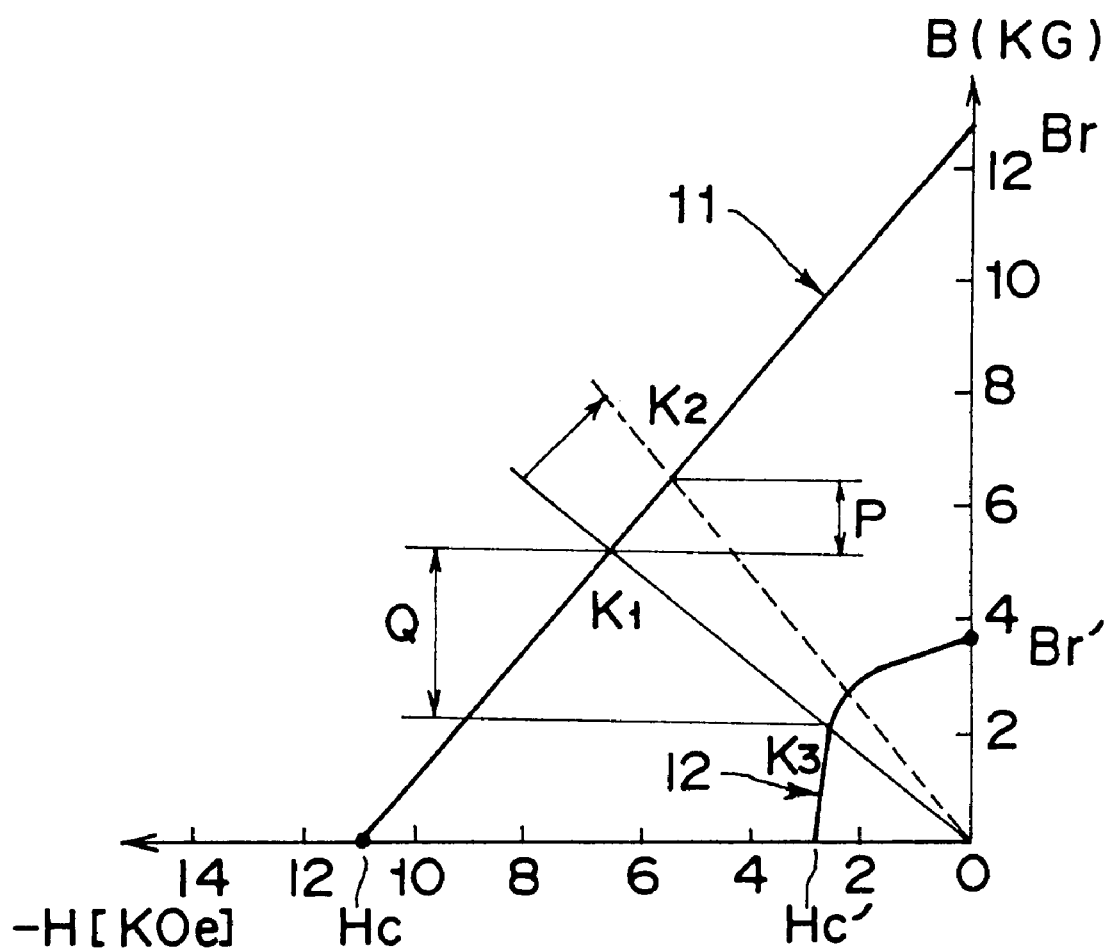
FIG. 23 is a graph of an H-B characteristic of permanent magnets.

FIG. 23 is a diagram of an H (magnetic field)-B (magnetic flux density) characteristic, where the ordinate represents the magnetic flux density B and the abscissa represents the magnetic field H. The permanent magnets 8a, 8b are made of neodymium iron magnet which has a demagnetization curve 11 shown in FIG. 23. An operating point K1 of the outer permanent magnet 8a lies on a line connecting a remanent magnetic flux density $B_r$ with a coercive force Hc. Since the inner permanent magnet 8b is thicker than the outer permanent magnet 8a, an operating point of the inner permanent magnet 8b is raised to a higher position K2.

A difference P between K1 and K2 in FIG. 23 represents a difference in magnetic flux density B. In the fourth embodiment, K2 is larger by nearly 4% than K1.

As described above, because the magnetic flux density is increased by approximately 4% at the inner permanent magnet 8b than at the outer permanent magnet 8a, a sufficient amount of magnetic flux is supplied to the outer permanent magnet 8a, thereby backing up the outer permanent magnet 8a enough, even if a part of the magnetic flux leaks out.

As descried above, in the motor according to the fourth embodiment, each permanent magnet is formed as an arch projecting towards the center of the rotor and the thickness of the permanent magnets at the inner side of the rotor of the two-layer permanent magnets is made larger by 3% or more than that of the permanent magnets at the outer side of the rotor. Then, the difference in thickness contributes to raise an operating point determining a magnetic flux density of the permanent magnets at the backup side. Accordingly, in comparison with the motor of the first embodiment, the magnetic flux density due to the permanent magnets at the inner side can be increased. Because the permanent magnets at the inner side fully back up even at the two ends of the permanent magnets 8a, 8b at the outer side, the problem of the first embodiment is solved. Then, the rotor with permanent magnets provided by the present embodiment thus effectively utilizes the magnet torque. However, if the thickness of the permanent magnets at the inner peripheral side is increased, but smaller than 3% than that of the permanent magnets at the outer side, the backup effect is not sufficient.

A fifth embodiment of the present invention will be described below. Inner and outer permanent magnets 8b, 8a are formed to have the same thickness. The fifth embodiment is the same as the fourth embodiment shown in FIG. 19 as far as the shape is concerned. However, this embodiment has a feature that the outer permanent magnets 8a are made of ferrite magnet, while the inner permanent magnets 8b are made of neodymium iron magnets.

In FIG. 23, reference numerals 11 and 12 represent H (magnetic flux)-B (magnetic flux density) characteristics of the neodymium iron magnet (permanent magnet 8b) and the ferrite magnet (permanent magnet 8a), respectively. As is clear from FIG. 23, a remanent magnetic flux density Br of the neodymium iron magnet 11 is approximately three times a remanent magnetic flux density Br' of the ferrite magnet 12. The outer permanent magnet 8a has a magnetic flux density determined by an operating point K3 in FIG. 23 and the inner permanent magnet 8b has a magnetic flux density determined by the operating point K1 in FIG. 23.

A difference Q between K1 and K3 represents a difference in magnetic flux densities of the inner and outer permanent magnets 8b, 8a. The inner permanent magnet 8b has the density nearly twice or more larger than that of the outer permanent magnet 8a.

Accordingly, even when the inner and outer permanent magnets 8b, 8a have the same thickness, if the permanent magnet made of a material of a larger remanent magnetic flux density $B_r$ is arranged at the backup side (inner side), the outer permanent magnet 8a can be fully backed up, similar to in the fourth embodiment.

As described above, in the motor of the fifth embodiment of the present invention, the permanent magnets of the two-layer structure are made of magnetic materials of remanent magnetic flux densities different by 3% or more from each other and the permanent magnets of a larger remanent magnetic flux density are arranged at the backup side (inner side). Then, the magnetic flux density due to the permanent magnets at the backup side can be increased if compared with the motor of the first embodiment, similarly in the fourth embodiment. Then, the rotor with permanent magnets provided by the present embodiment thus effectively utilizes the magnet torque.

However, if the remanent magnetic flux density of the permanent magnets at the inner side is increased, but smaller than 3% of the permanent magnets at the outer side, the backup effect is not sufficient.

Although four poles of permanent magnets 8 are used in the fourth and fifth embodiments, a number of poles may be other than four. Although the ferrite magnet 12 and neodymium iron magnet 11 are used as magnetic materials of different remanent magnetic flux densities in the fifth embodiment, other kinds of combinations, e.g., cobalt magnets and Alnico magnets may be used. Further, magnets of the same series, but having different remanent magnetic flux densities may be combined. Moreover, while each of the permanent magnets 8a and 8b in the fourth and fifth embodiments are totally made of a permanent magnet up to the ends thereof, the ends may be an air gap (air layer) or made of a synthetic resin layer. Further, features of the fourth and fifth embodiments may be combined. In other words, the present invention is not limited to the fourth and fifth embodiments and may be modified in various ways according to the spirit thereof which should not be excluded from the scope of the invention.

Figure 24:
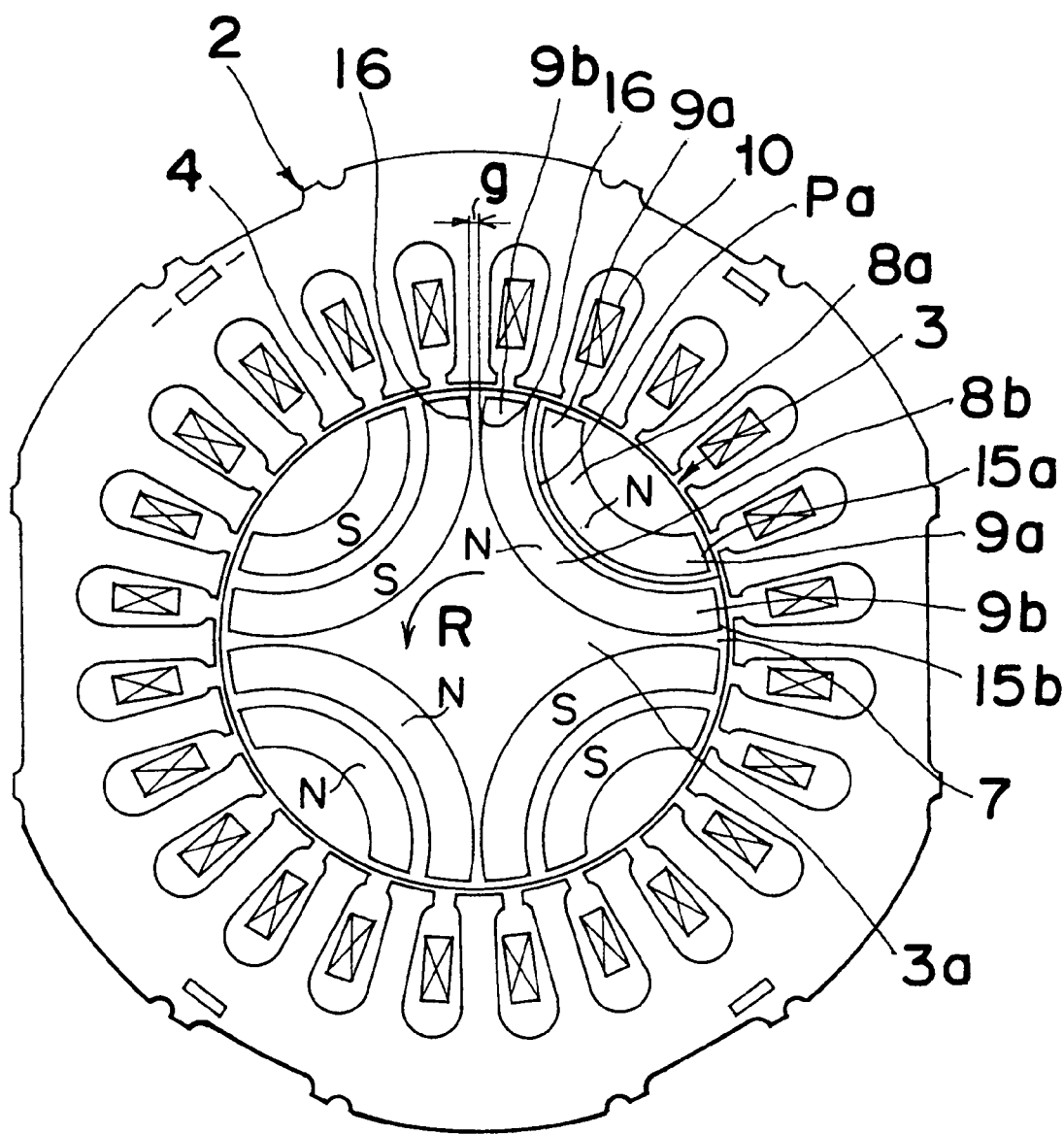
FIG. 24 is a sectional view of the motor of the first embodiment.

Next, a sixth embodiment according to the invention is explained. First, a problem to be solved by the sixth embodiment is explained. FIG. 24 shows the motor of the first embodiment where a rotor has two-layer permanent magnets in order to effectively utilize a reluctance torque. According to the first embodiment, four sets of two-layer permanent magnets 8a and 8b with a space between them in a radial direction of a rotor 3 are embedded in a rotor core 3a. The permanent magnets 8a, 8b in each set are adjacent to each other with S and N poles arranged alternately. Moreover, the permanent magnets 8a, 8b in a set have the same polarity at outer peripheral sides thereof. Every permanent magnet 8a, 8b at the inner and outer sides in the rotor is formed like an arch projecting towards the center of the rotor.

The outer and inner permanent magnets 8a and 8b are arranged to form concentric circles, keeping a constant distance therebetween. Because the two-layer permanent magnets 8a, 8b have shapes of arches projecting towards the center of the rotor, side faces of ends 9a, 9b thereof are rendered approximately orthogonal to the surface of the rotor.

Figure 25:
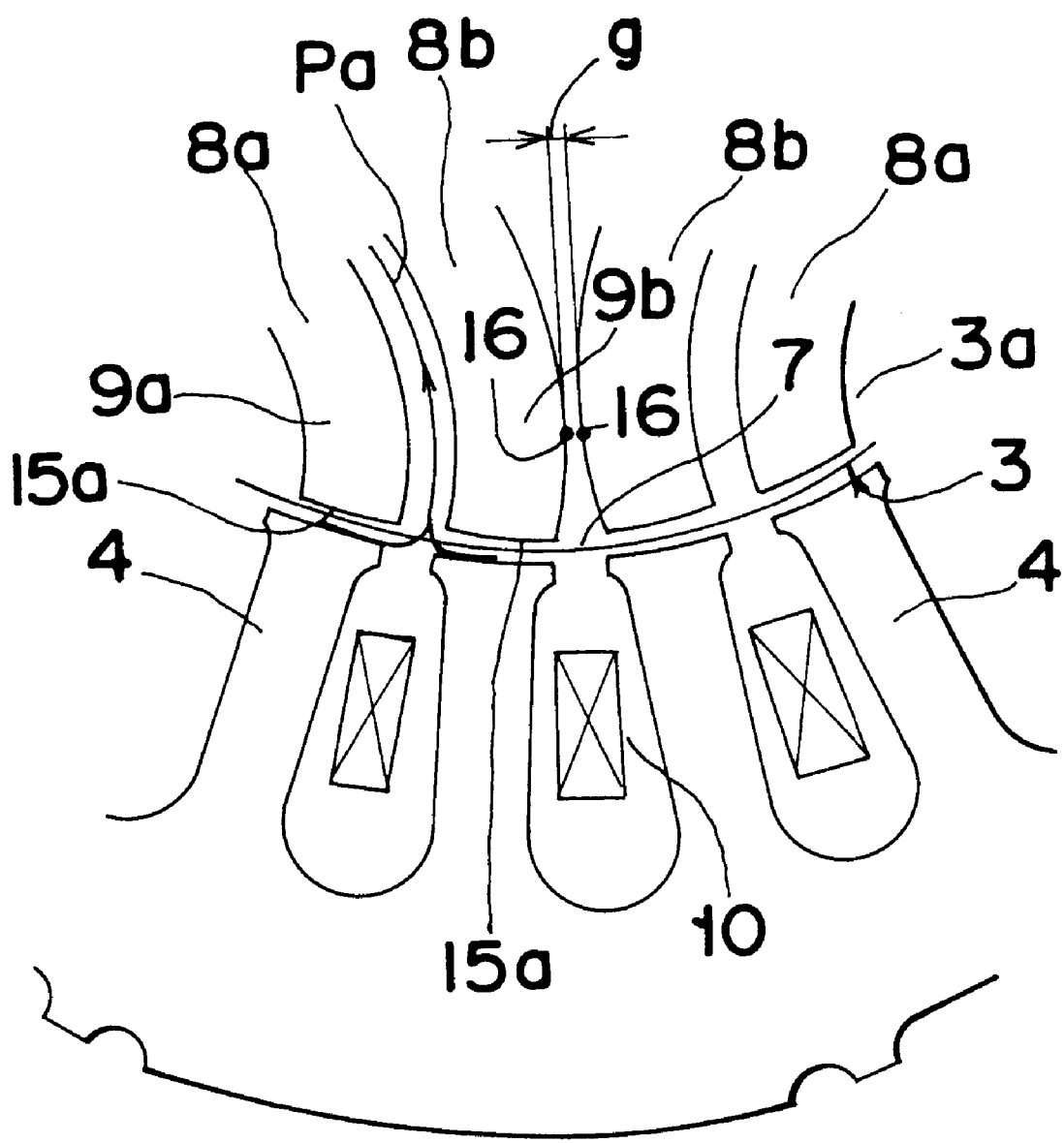
FIG. 25 is a partial sectional view of FIG. 24.

As shown in FIG. 24 and 25, each permanent magnet 8a, 8b has the same width all over the entire length thereof, and a front end face 15a, 15b of the permanent magnets is flat. Further, the inner permanent magnets 8b, 8b adjacent to each other become closest at points 16, which are space a distance g, before reaching the front end faces 15b, 15b, and it is opened like a fan at the front ends.

The rotor 3 of the motor of the first embodiment is rotated in R direction by a synthetic torque including a magnet torque and a reluctance torque. The magnetic torque results from a rotational magnetic field generated by windings 10 in teeth 4 of a stator 2 and a magnetic field by the permanent magnets 8a, 8b, while the reluctance torque is generated with a magnetic path of the above rotational magnetic field formed at the surface of the rotor core 3a and at the interval of the inner and outer permanent magnets 8b and 8a.

Figure 3:
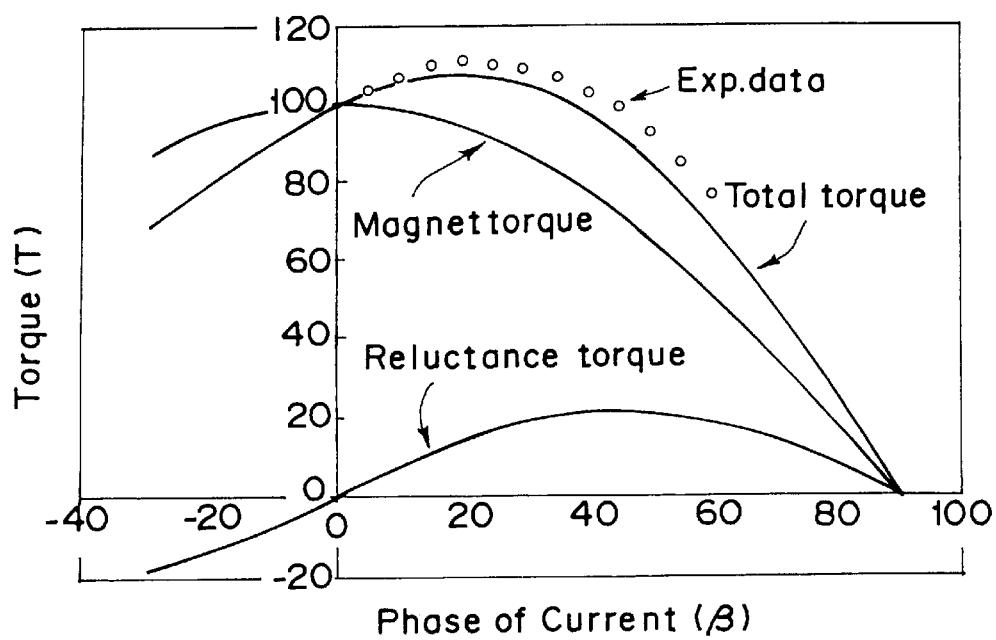
FIG. 3 is a graph showing a relation of a current phase, a magnet torque, a reluctance torque and a total torque.

In the above-mentioned motor of the first embodiment, the most effective magnetic flux to obtain the reluctance torque is one formed along a magnetic path Pa shown in FIG. 3. In other words, among the magnetic flux flowing from one tooth 4 to the other tooth 4, the higher is the density of a magnetic flux passing the rear face of the outer permanent magnet 8a, and therefore generating the most reluctance torque.

However, the end faces 15a, 15b of the permanent magnets 8a, 8b forming a magnetic space are opposed to the teeth 4 with a considerable distance between them when the rotor 3 is at a rotating position shown in FIG. 25. As a result, the magnetic path Pa is excessively bent at this position, and the magnetic resistance at the magnetic path Pa is eventually increased. Then, the magnetic flux density at the magnetic path Pa is lowered considerably, making it impossible to generate the reluctance torque sufficiently.

Further, in the motor of the first embodiment, the points 16, 16 where the permanent magnets 8b at the inner side adjacent to each other become closest are located considerably inside from the outer periphery of the rotor 3. An amount of magnetic flux passing the interval of the permanent magnets is restricted by the distance g of the points 16, and the fan-like part at the outer side than the points 16 becomes a dead space 7. The presence of the dead space 7 is not preferable from a view point of efficient generation of the magnet torque and the reluctance torque.

Figure 26:
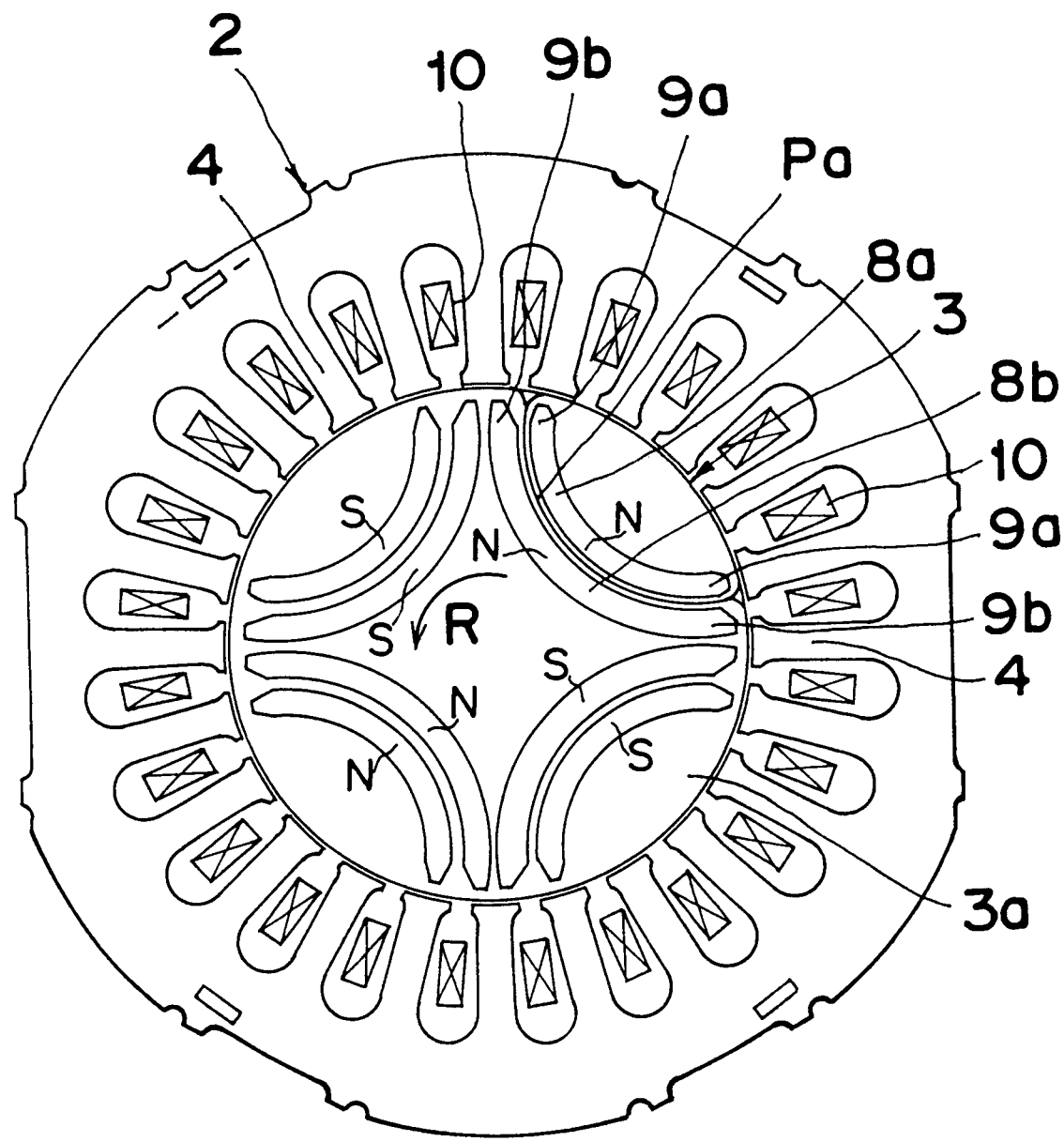
FIG. 26 is a sectional view of a fifth embodiment of the present invention.

The sixth embodiment of the present invention which solve the problem will be fully described below. FIG. 26 shows a motor 3 constructed in accordance with the sixth embodiment. The motor includes a rotor 3 adhered to a rotor shaft 7 and a stator 2 which houses the rotor 3. The rotor 3 includes four sets of two-layer permanent magnets 8a and 8b for a pole with a space between them in a radial direction of the rotor 3. The four sets of permanent magnets are embedded in a rotor core 3a of the rotor 3 with a constant distance in a circumferential direction of the rotor 3. The four sets of the permanent magnets 8a, 8b are adjacent to each other with N and S poles arranged alternately. Moreover, the permanent magnets 8a, 8b in a set have the same polarity at outer peripheral sides thereof. The outer and inner permanent magnets 8a, 8b are formed like an arch projecting towards the center of the rotor. The outer and inner permanent magnets 8a, 8b in a set are arranged in parallel with a nearly constant distance between them except at ends 9a, 9b thereof.

Figure 27:
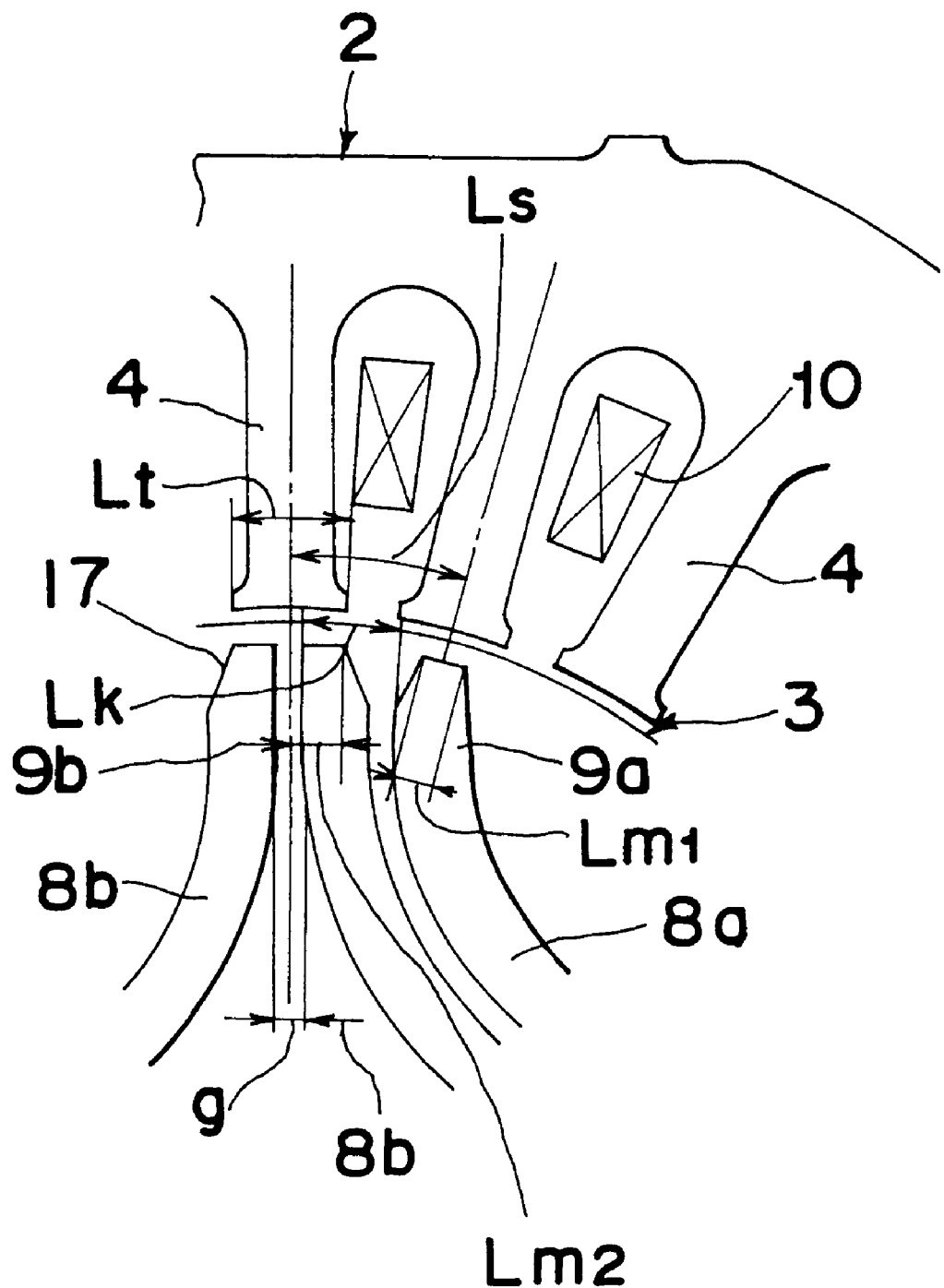
FIG. 27 is an enlarged sectional view of an essential part in FIG. 26.

The ends 9a, 9b of the permanent magnets 8a, 8b are tapered around the ends so as to be thinned towards the outer surface of the rotor 3. They are approximately perpendicular to the surface of the rotor 3. The end 9a of the outer permanent magnet 8a is cut at both sides thereof to have a narrowed top end. On the other hand, the end 9b of the inner permanent magnet 8b is so formed that outer surfaces of the permanent magnet 8b and the other permanent magnet 8b at the inner side adjacent to the former permanent magnet extend in parallel to each other in the radial direction of the rotor 3 with a constant distance g between them (refer to FIG. 27). Moreover, the end 9b of the permanent magnet 8b at the inner side is cut so as to be narrowed only at a side of an inner surface thereof. FIG. 27 shows the cut-off part 17.

Because the ends 9a, 9b are narrowed as described above, front ends of the permanent magnets 8b, 8a at the inner side and at the outer side can be extended to positions in the vicinity of the surface of the rotor 3, without decreasing the strength of the rotor core 3a.

A plurality of teeth 4 are provided in the stator 2, with windings 10 wound therebetween. A rotational magnetic field is generated when an alternating current is supplied to the windings 10. The rotor 3 is rotated in R direction of FIG. 26 due to the rotational magnetic field. In FIG. 26, a flow path of the most effective magnetic flux to generate a reluctance torque is indicated as Pa.

In the present embodiment, as shown in FIG. 27, relations, $$Lm1 = 0.4 * Lt,$$

and $$Lm2 = 0.4 * Lt,$$

are satisfied, where Lt denotes a width between front ends of teeth 4 is, Lm1 denotes a width of the front end of the outer permanent magnet 8a, and Lm2 denotes a width of the front end of the inner permanent magnet 8b. The widths Lm1, Lm2 of front ends of the two permanent magnets 8a, 8b are preferably not to be larger than 0.7*Lt.

Figure 28:
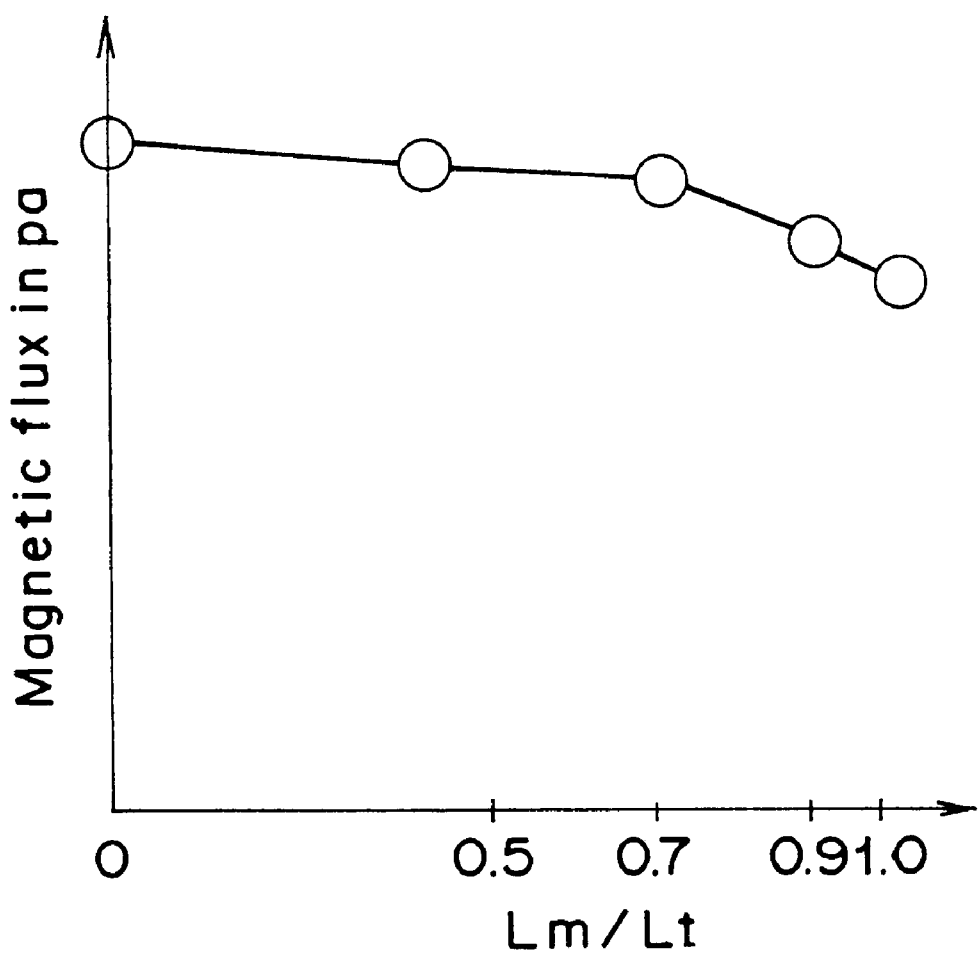
FIG. 28 is a graph of a relation of a passing amount of magnetic flux in Pa to Lm/Lt.

FIG. 28 shows a relation of a ratio Lm/Lt of the width Lm (=Lm1=Lm2) of the front end of the permanent magnets 8a, 8b and the width Lt of front ends of the teeth 4, and an amount of magnetic flux flowing in the magnetic path Pa. If Lm/Lt is not larger than 0.7, the amount of magnetic flux becomes a predetermined value or higher, and it is stable.

Figure 1:
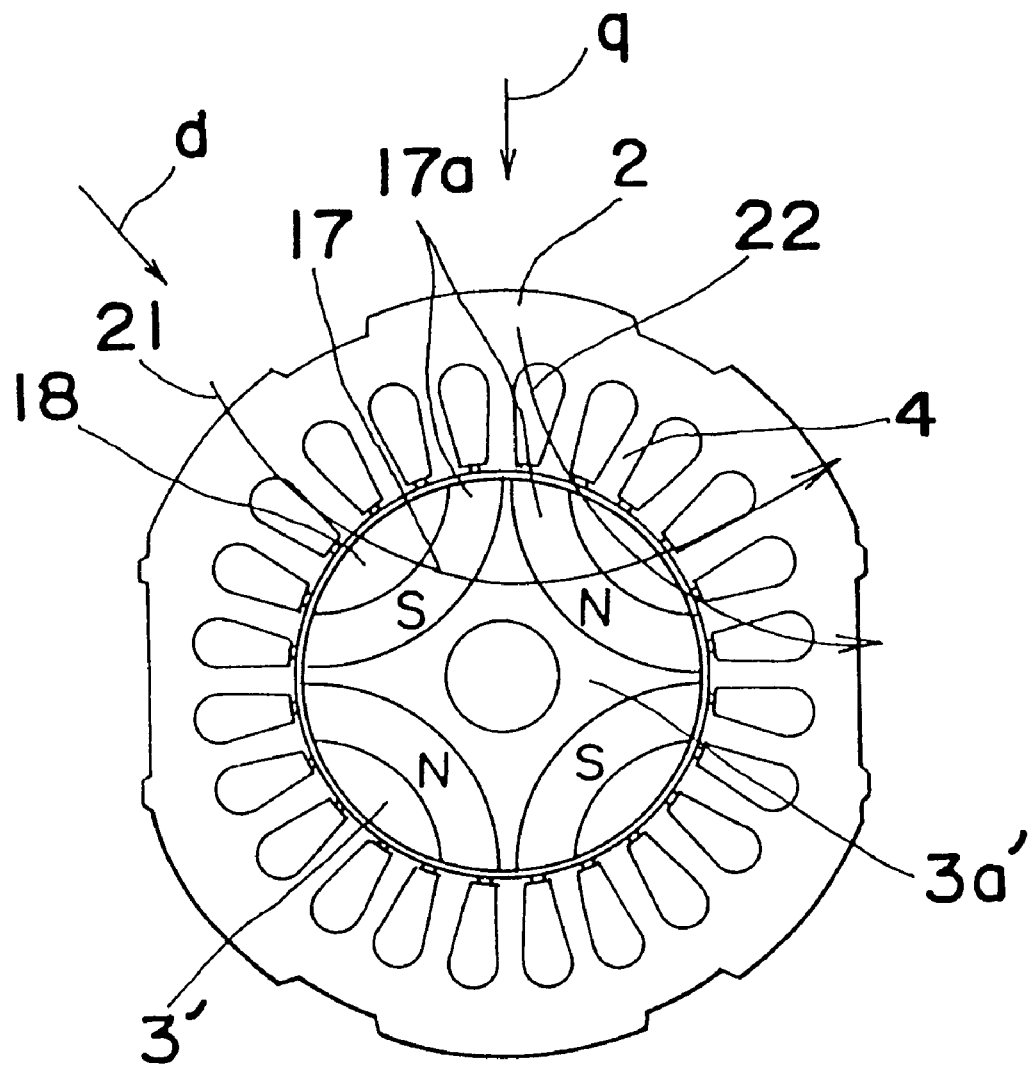
FIG. 1 is a sectional view of a conventional motor with built-in permanent magnets arranged in one layer.
Figure 2:
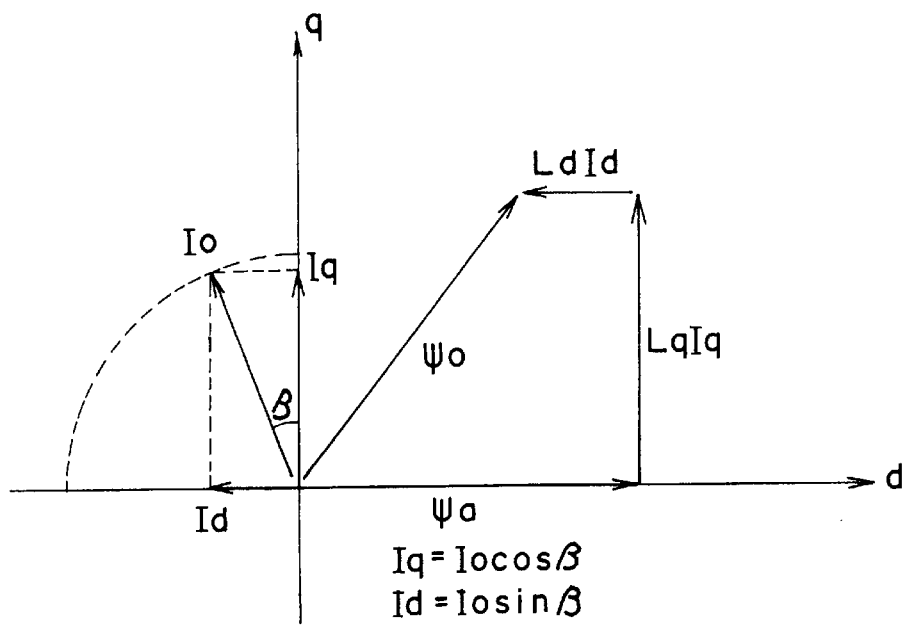
FIG. 2 is a magnetic flux vector diagram after the a d-q conversion.

According to the embodiment, a relation, $$Ls = 1.5 * Lk,$$

is satisfied where Lk denotes a pitch between front ends of the inner and outer permanent magnets 8a, 8b and Ls denotes a pitch of the teeth 4, as in FIG. 2. It is preferable that the pitches Lk, Ls hold a relation expressed by Equation (2) or (3);

$$1.3*Ls \leq Lk \leq 1.7*Ls, \quad (2)$$

or $$1.3*Lk \leq Ls \leq 1.7*Lk, \quad (3)$$

where Lk denotes a pitch of front ends of the permanent magnet at the inner peripheral side of the rotor and the permanent magnet at an outer peripheral side of the rotor and Ls denotes a pitch of the teeth of the stator. It is also preferable that front end faces 15a, 15b of permanent magnets 8a, 8b do not agree with the front ends of the teeth 4 simultaneously.

Although four sets of permanent magnets 8a, 8b are employed in the sixth embodiment, a different number of sets may be allowed. Furthermore, although each permanent magnet 8a, 8b in the sixth embodiment is totally made of a permanent magnet up to the ends 9a, 9b, the ends 9a, 9b may be an air space (air layer) or may be made of a synthetic resin layer. Moreover, the permanent magnet 8 is not restricted to the two-layer structure, but may be formed in one layer or in three or more layers. While the pitch of front ends of the inner and outer permanent magnets 8a, 8b is set to hold Ls=1.5, a different pitch from that of the embodiment may be adopted, e.g., satisfying Ls=Lk as in the first embodiment shown in FIG. 24. Although front ends of the permanent magnets 8a, 8b are cut off at side faces thereof so as to be narrowed in the motor of the present embodiment, the front ends may be rounded like an arch. In other words, the present invention is not limited to the above embodiment, but may be modified in various forms based on the aim thereof which should not be excluded from the scope of the present invention.

The advantages of the sixth embodiment are explained here further. Because both front ends of each permanent magnet 8a, 8b are narrowed at positions near the surface of the rotor 3 and embedded approximately at right angles to the surface of the rotor 3, a magnetic flux density of a magnetic path Pa which effectively generates a reluctance torque is maintained high even when the rotor 3 is rotated to the rotating position as shown in FIG. 25. That is, because the opposed face of the permanent magnet 8a, 8b is narrowed at the front end thereof, the magnetic flux flowing on the magnetic path Pa is guided smoothly into the rotor 3 even when the teeth 4 of the stator 2 are at positions opposed to the end of the permanent magnet 8a, 8b. Therefore, the reluctance torque is effectively generated if compared with the first embodiment.

Because the width Lm of the narrowed front end of the permanent magnet 8a, 8b is not larger than 70% of the width Lt of front ends of the teeth 4 of the stator, more magnetic flux is guided to the magnetic path Pa, so that the above operation can be performed more effectively (refer to FIG. 28).

When the permanent magnets 8a, 8b are embedded in two layers for a pole with a distance between them in the radial direction of the rotor 3, and both ends of each permanent magnet 8a, 8b at the inner side of the rotor 3 are cut mainly at inner surfaces thereof to be narrowed, much more magnetic fluxes are guided between the inner and outer permanent magnets 8a, 8b, thereby increasing the magnetic flux density on the magnetic path Pa acting effectively relative to the generation of the reluctance torque. A large amount of reluctance torque is accordingly obtained.

In the two-layer structure, if the pitch Lk at the front end parts of the inner and outer permanent magnets 8a, 8b is 1.3–1.7 times the pitch Ls of teeth 4 as represented in Equation (2), or if the Ls is set to be 1.3–1.7 times Lk, thereby not to make front end faces of both permanent magnets agree with the front end faces of the teeth 4 at the same time, the magnetic flux from the teeth 4 can be smoothly guided between the inner and outer permanent magnets 8a, 8b, so that a large reluctance torque is generated.

If outer surfaces at both ends of the adjacent permanent magnets are extended approximately parallel to each other in the radial direction of the rotor 3, the interval of the ends of the permanent magnet and the other permanent magnet adjacent to the above permanent magnet is rendered constant, thus eliminating a dead space. If the interval of both ends is set to be small, similar to the minimum distance g in the first embodiment, a surface area effective to generate a magnet torque of permanent magnets is expanded. Alternatively, if the interval at both ends is set to be larger than the minimum distance g, an amount of magnetic flux flowing in the interval is increased, so that the reluctance torque generated is increased.

According to the sixth embodiment, even when the rotor is at a rotating position where it is hard to utilize the reluctance torque as in the first embodiment invention, the flow of magnetic fluxes is formed inside the rotor to facilitate the generation of the reluctance torque. Thus, the embodiment provides a rotor with permanent magnets effectively utilizing the reluctance torque.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An interior permanent magnet motor comprising:
    a stator having a plurality of windings wound around an iron core; and
    a rotor, rotatably surrounding said stator, comprising a rotor core formed of a high magnetic permeability material and a plurality of sets of permanent magnet layers embedded in the rotor core,
    wherein each set of permanent magnet layers of said plurality of sets of permanent magnet layers includes a plurality of permanent magnet layers,
    said plurality of sets of permanent magnet layers are arranged so as to have N and S poles alternately located at outer peripheral sides of said plurality of sets of permanent magnet layers, and
    each permanent magnet layer of said plurality of permanent magnet layers includes first and second ends which are located near an outer periphery of said rotor, and
    each permanent magnet layer of said plurality of permanent magnet layers has a first surface directed to the outer peripheral surface of said rotor and a second surface directed to a center of said rotor, and an area of said second surface is wider than that of said first surface.

2. The interior permanent magnet motor as claimed in claim 1, wherein each of said plurality of permanent magnet layers has a configuration which converges toward the center of said rotor.

3. The interior permanent magnet motor as claimed in claim 1, wherein each of said plurality of permanent magnet layers has an arch shape and defines a convex surface which extends toward the center of said rotor.

4. The interior permanent magnet motor as claimed in claim 1, wherein said plurality of permanent magnet layers include first and second permanent magnet layers which are spaced by an interval which is constant.

5. The interior permanent magnet motor as claimed in claim 4, wherein:

said stator comprises teeth for forming windings, each of said teeth has a width, and said interval between said first and second permanent magnet layers is greater than a third of said width of each of said teeth.

6. The interior permanent magnet motor as claimed in claim 1, wherein;

said plurality of permanent magnet layers include first and second permanent magnet layers which are spaced by an interval;

said first ends of said first and second permanent magnet layers are located adjacent each other;

said second ends of said first and second permanent magnets are located adjacent each other;

said interval is widest at said first ends of said first and second permanent magnet layers, and said first ends of said first and second permanent magnet layers are leading ends relative to a rotating direction of said rotor.

7. The interior permanent magnet motor as claimed in claim 1, wherein:

each of said plurality of permanent magnet layers is arc shaped in cross section, and a center of curvature of an innermost permanent magnet layer of said plurality of permanent magnet layers is positioned farther from [a] the center of said rotor than a center of curvature of an outermost permanent magnet layer such that an interval between said innermost permanent magnet layer and said outermost permanent magnet layer is greatest at adjacent ends thereof.

8. The interior permanent magnet motor as claimed in claim 1, wherein each of said plurality of permanent magnet layers has first and second ends which have tapered surfaces which taper in a direction towards an outer peripheral surface of said rotor.

9. The interior permanent magnet motor as claimed in claim 8, wherein said stator comprises teeth for windings, and the following relationship is satisfied:

$$Lm \leq 0.7*Lt,$$

where Lm denotes a width of one of said tapered ends of each of said plurality of permanent magnet layers and Lt denotes a distance between ends of two adjacent teeth of said stator.

10. The interior permanent magnet motor as claimed in claim 8, wherein outer surfaces at said ends of adjacent permanent magnet layers of said plurality of sets of permanent magnet layers extend in parallel to each other in a radial direction of said rotor, and said adjacent permanent magnet layers have different polarities.

11. The interior permanent magnet motor as claimed in claim 1, wherein said plurality of sets of permanent magnet layers comprises four sets of permanent magnet layers.

12. The interior permanent magnet motor as claimed in claim 1, wherein an end of each of said plurality of permanent magnet layers comprises a space which is filled with air or synthetic resin.

13. An interior permanent magnet motor comprising:

a stator having a plurality of windings wound around an iron core; and a rotor, enclosed within said stator, including a rotor core formed of a high magnetic permeability material and a plurality of sets of two permanent magnet layers embedded in said rotor core, wherein a set of said plurality of sets of two permanent magnet layers includes a first permanent magnet layer at an outer peripheral surface of said rotor and a second permanent magnet layer positioned inwardly of said first permanent magnet layer, said plurality of sets of two permanent magnet layers are arranged so as to have N and S poles positioned alternately at outer peripheral sides of said plurality of sets of two permanent magnet layers, each of said first and second permanent magnet layers has opposite ends and is configured such that said opposite ends are positioned near said outer peripheral surface of said rotor, and each permanent magnet layer of said plurality of sets of two permanent magnet layers has a first surface directed to the outer peripheral surface of said rotor and a second surface directed to a center of said rotor, and an area of said first surface is wider than that of said second surface.

14. The interior permanent motor as claimed in claim 13, wherein each of said first and second permanent magnet layers is configured so as to have the shape of an arch which converges toward the center of said rotor.

15. The interior permanent motor as claimed in claim 13, wherein each set of said plurality of sets of two-layer permanent magnet layers comprises two permanent magnet layers embedded in said rotor core, each of said two permanent magnet layers has the shape of an arch having a convex surface directed toward the center of said rotor, and an innermost one of said two permanent magnet layers has a thickness which is larger by 3% or more than a thickness of the other of said two permanent magnet layers.

16. The interior permanent magnet motor as claimed in claim 13, wherein:

each set of said plurality of sets of two-layer permanent magnet layers comprises two permanent magnet layers embedded in said rotor core, each of said two permanent magnet layers has the shape of an arch having a convex surface which projects towards said center of said rotor, one of said two permanent magnet layers is innermost relative to said center of said rotor and is made of a magnetic material, the other of said two permanent magnet layers is made of a magnetic material, and said magnetic material of said one of said two permanent magnet layers has a remanent magnetic flux density which is greater than a magnetic flux density of said other of said two permanent magnets by 3% or more.

17. The interior permanent magnet motor as claimed in claim 13, wherein each of said opposite ends of said second permanent magnet layer are cut at inner surfaces to form tapered opposite ends.

18. The interior permanent magnet motor as claimed in claim 17, wherein outer surfaces at ends of adjacent permanent magnet layers of different polarities extend in parallel to each other along a radial direction of said rotor.

19. The interior permanent magnet motor as claimed in claim 13, wherein said stator comprises teeth for windings, and one of the following relationships is satisfied:

$$1.3*Ls \leq Lk \leq 1.7*Ls$$

or $$1.3*Lk \leq Ls \leq 1.7*Lk$$

where Lk denotes a pitch of adjacent ends of said first and second permanent magnet layers and Ls denotes a pitch of said teeth of said stator.

20. The interior permanent magnet motor as claimed in claim 13, wherein:

said stator comprises teeth for forming windings;

each of said teeth has a width; and an interval between said first and second permanent magnet layers is greater than a third of said width of each of said teeth.

21. The interior permanent magnet motor as claimed in claim 13, wherein said stator comprises teeth for windings, and one of the following relationships is satisfied:

$$1.3*Ls \leq Lk \leq 1.7*Ls$$

or $$1.3*Lk \leq Ls \leq 1.7*Lk,$$

where Lk denotes a pitch of adjacent ends of said first and second permanent magnet layers and Ls denotes a pitch of said teeth of said stator.

22. The interior permanent magnet motor as claimed in claim 21, wherein outer surfaces at the ends of adjacent permanent magnet layers of different polarities extend in parallel to each other in a radial direction of said rotor.

23. An internal permanent motor having built-in permanent magnets, wherein a magnetic torque is generated according to a relationship between a rotating magnetic field of a stator and a magnetic field of the permanent magnets, a reluctance torque is generated due to magnetic flux path of the rotating magnetic field and a synthesized torque of the magnetic torque and the reluctance torque smaller than the magnetic torque is used for rotation, comprising:

a stator;

a rotor surrounded by said stator; and a plurality of permanent magnet layers embedded in said rotor, said permanent magnet layers being layered in the radial direction of each pole, the ends of each of said permanent magnet layers being located near an outer peripheral surface of said rotor, and magnetic flux paths are provided between said layered permanent magnet layers, wherein a magnetic torque is generated according to a relationship between a rotating magnetic field of said stator and a magnetic field of said permanent magnets, a reluctance torque is generated due to magnetic flux path of the rotating magnetic field and a synthesized torque of the magnetic torque and the reluctance torque smaller than the magnetic torque is used for rotation.

24. The motor as claimed in claim 23, wherein the number of said permanent magnets layered in the radial direction for each pole is two.

25. The motor as claimed in claim 24, wherein each of said permanent magnetic layers has an arch shape and defines a convex surface which extends toward a center of said rotor.

26. The motor as claimed in claim 24, wherein said two permanent magnet layers are spaced by an interval which is constant.

27. The motor as claimed in claim 26, wherein said stator comprises a plurality of teeth for receiving windings thereon, each of said teeth has a width, and the interval between the two permanent magnet layers is greater than a third of said width of each of said teeth.

28. The motor as claimed in claim 24, wherein said permanent magnet is formed of a permanent magnetic material.

29. The motor as claimed in claim 24, wherein said permanent magnet is formed of a permanent magnetic material and includes an air space at the end thereof.

30. The motor as claimed in claim 24, wherein said permanent magnet is formed of a permanent magnetic material and includes a section at the end thereof which is filled with a synthetic resin.

31. An internal permanent motor having built-in permanent magnets, said motor comprising:

a stator having a plurality of windings wound around an iron core; and a rotor surrounded by said stator, said rotor comprising a rotor core made of a high magnetic permeability material and a plurality of permanent magnet layers being embedded for each pole in said rotor core, said permanent magnet layers being layered in a radial direction, two ends of each permanent magnet layer being narrowed, and two ends of each permanent magnet layer being located near an outer peripheral surface of said rotor and extend perpendicularly thereto, wherein a magnetic torque is generated according to a relationship between rotating magnetic field of said stator and magnetic field of said permanent magnets, a reluctance torque is generated due to magnetic flux path of the rotating magnetic field and a synthesized torque of the magnetic torque and the reluctance torque smaller than the magnetic torque is used for rotation.

32. The motor as claimed in claim 31, wherein said stator comprises teeth for windings, and the following relationship is satisfied:

$$Lm \leq 0.7*Lt,$$

where Lm denotes a width of the narrowed end of the permanent magnet layers and Lt denotes a width between ends near the rotor of two teeth of the stator.

33. The motor as claimed in claim 31, wherein the number of said permanent magnet layers is two for a pole.

34. The motor as claimed in claim 33, wherein the two ends of said permanent magnet layer, located at an inner side in said rotor, are tapered mainly at an inside surface thereof.

35. The motor as claimed in claim 33, wherein said stator comprises a plurality of teeth for windings, and one of the following relations is satisfied:

$$1.3*Ls \leq Lk \leq 1.7*Ls,$$

or $$1.3*Lk \leq Ls \leq 1.7*Lk,$$

where Lk denotes a pitch of adjacent ends of said two permanent magnet layers and Ls denotes a pitch of the teeth of said stator.

36. The motor as claimed in claim 31, wherein outer surfaces at the ends of adjacent permanent magnets of different polarities are extended in parallel to each other in the radial direction of said rotor.

* * * * *